(12) United States Patent
Wu et al.

(10) Patent No.: US 11,838,081 B2
(45) Date of Patent: Dec. 5, 2023

(54) CHANNEL STATE INFORMATION (CSI) REPORT SENDING AND RECEIVING METHODS, DEVICES AND ELECTRONIC DEVICES

(71) Applicant: ZTE CORPORATION, Guangdong (CN)

(72) Inventors: Hao Wu, Guangdong (CN); Yu Ngok Li, Guangdong (CN); Chuangxin Jiang, Guangdong (CN); Shujuan Zhang, Guangdong (CN); Yijian Chen, Guangdong (CN); Zhaohua Lu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/894,397

(22) Filed: Aug. 24, 2022

(65) Prior Publication Data
US 2022/0407577 A1 Dec. 22, 2022

Related U.S. Application Data

(63) Continuation of application No. 16/969,640, filed as application No. PCT/CN2019/073873 on Jan. 30, 2019, now Pat. No. 11,469,808.

(30) Foreign Application Priority Data

Feb. 13, 2018 (CN) .......................... 201810150889.X

(51) Int. Cl.
*H04B 7/06* (2006.01)
*H04W 76/27* (2018.01)
*H04L 1/00* (2006.01)
*H04L 5/00* (2006.01)
*H04L 5/10* (2006.01)
(Continued)

(52) U.S. Cl.
CPC ......... *H04B 7/0626* (2013.01); *H04L 1/0061* (2013.01); *H04L 5/0051* (2013.01); *H04L 5/10* (2013.01); *H04W 72/0453* (2013.01); *H04W 72/1263* (2013.01); *H04W 72/23* (2023.01); *H04W 72/53* (2023.01); *H04W 76/27* (2018.02); *H04W 80/02* (2013.01)

(58) Field of Classification Search
None
See application file for complete search history.

(56) References Cited

U.S. PATENT DOCUMENTS

2018/0343653 A1* 11/2018 Guo ..................... H04W 72/542
2020/0037293 A1* 1/2020 Reial .................... H04W 48/08
(Continued)

*Primary Examiner* — Otis L Thompson, Jr.
(74) *Attorney, Agent, or Firm* — KDW Firm PLLC

(57) ABSTRACT

Provided are methods and devices for determining a quasi-co-location (QCL) parameter, and the method comprises: receiving configuration information; and determining whether the configuration information satisfies a predetermined constraint condition, and determining an acquisition mode of a QCL parameter of a signal according to the determination result; in a case where the configuration information satisfies the constraint condition, determining the QCL parameter of the signal according to a first acquisition mode; in a case where the configuration information does not satisfy the constraint condition, determining the QCL parameter of the signal according to a second acquisition mode.

16 Claims, 9 Drawing Sheets

(51) Int. Cl.
  *H04W 72/0453* (2023.01)
  *H04W 72/1263* (2023.01)
  *H04W 80/02* (2009.01)
  *H04W 72/23* (2023.01)
  *H04W 72/53* (2023.01)

(56) References Cited

U.S. PATENT DOCUMENTS

| | | | |
|---|---|---|---|
| 2020/0145082 A1* | 5/2020 | Chen | H04L 5/0064 |
| 2020/0288472 A1* | 9/2020 | Chen | H04B 7/2628 |
| 2020/0412506 A1* | 12/2020 | Määttanen | H04B 7/0413 |
| 2021/0250072 A1* | 8/2021 | Zhang | H04B 7/0691 |
| 2023/0145663 A1* | 5/2023 | Kwon | H04W 72/046 |
| | | | 370/318 |
| 2023/0180331 A1* | 6/2023 | Zhu | H04W 76/19 |
| | | | 370/252 |
| 2023/0189011 A1* | 6/2023 | Si | H04L 5/0048 |
| | | | 370/329 |
| 2023/0189020 A1* | 6/2023 | Calcev | H04W 24/10 |
| | | | 370/329 |
| 2023/0189261 A1* | 6/2023 | Matsumura | H04W 72/1273 |
| | | | 370/329 |

* cited by examiner

Resource 1
Resource 2
DMRS of resource 1
DMRS of resource 2
DMRS of a mergence resource Resource 1
Resource 2
DMRS segment 1
DMRS segment 2
DMRS segment 3

US 11,838,081 B2

CHANNEL STATE INFORMATION (CSI) REPORT SENDING AND RECEIVING METHODS, DEVICES AND ELECTRONIC DEVICES

CROSS-REFERENCES TO RELATED APPLICATION

The present application is a continuation application of U.S. patent application Ser. No. 16/969,640, filed on Aug. 13, 2020, which is a U.S. National Stage Application, filed under 35 U.S.C. 371, of International Patent Application No. PCT/CN2019/073873, filed on Jan. 30, 2019, which claims priority to Chinese patent application 201810150889.X filed on Feb. 13, 2018, contents of all of which are incorporated herein by reference in their entireties.

TECHNICAL FIELD

The present disclosure relates to the field of communications and, for example, relates to methods and devices for sending and receiving a channel state information (CSI) report, and electronic devices.

BACKGROUND

In multiple-input-multiple-output (MIMO) wireless communications, CSI feedback is a key technique for implementing high-performance beamforming and precoding. In a wireless communication system, CSI is transmitted in an uplink channel. The uplink channel includes a physical uplink control channel (PUCCH) or a physical uplink shared channel (PUSCH). Generally, if there are multiple CSI reports to be reported, the terminal transmits different CSI reports on corresponding uplink channel resources; and if there is collision between two or more uplink channel resources, it is necessary to solve the problem of how to report corresponding CSI.

SUMMARY

The present disclosure provides methods and devices for sending and receiving a CSI report, and electronic devices, so as to overcome the difficulty in related art that there is no solution for reporting CSI reports if collision exists between uplink channel resources.

The present disclosure provides a method for sending a CSI report. The method includes that a terminal determines priorities of M CSI reports, where M is a natural number not less than 1; an available channel resource is selected from a channel resource set for transmitting the M CSI reports, where the channel resource set includes J channel resources supporting transmission of the M CSI reports and J is a natural number not less than 1; and the CSI reports are transmitted according to the priorities by using the available channel resource.

A method for receiving a CSI report is further provided. The method includes that a base station determines priorities of M CSI reports, where M is a natural number not less than 1; an available channel resource is selected from a channel resource set for receiving the M CSI reports, where the channel resource set includes J channel resources supporting reception of the M CSI reports and J is a natural number not less than 1; and at least one CSI report is received according to the priorities by using the available channel resource.

A method for determining a QCL parameter is further provided. The method includes determining whether configuration information satisfies a predetermined constraint condition, and determining an acquisition mode of a QCL parameter of a signal according to a determination result; or determining the acquisition mode of the QCL parameter of the signal according to signaling information.

A method for determining a QCL parameter of an aperiodic measurement reference signal is further provided. The method includes the step described below.

The quasi-co-location (QCL) parameter of the aperiodic measurement reference signal is determined according to physical-layer dynamic control signaling. The physical-layer dynamic control signaling includes configuration information about the QCL parameter of the aperiodic measurement reference signal.

A method for transmitting a reference signal is further provided. The method includes the steps described below.

A sequence parameter associated with the reference signal is determined, where the sequence parameter is used for generating a sequence, and the sequence parameter hops once every X time domain symbols, where X is an integer greater than or equal to 1. The reference signal is determined according to the determined sequence parameter. The reference signal is transmitted.

A device for sending a CSI report is further provided. The device is applied to a terminal and includes a determination module, a selection module and a transmission module. The determination module is configured to determine priorities of M CSI reports, where M is a natural number not less than 1. The selection module is configured to select an available channel resource from a channel resource set for transmitting the M CSI reports, where the channel resource set includes J channel resources supporting transmission of the M CSI reports and J is a natural number not less than 1. The transmission module is configured to transmit at least one CSI report according to the priorities by using the available channel resource.

A device for receiving a CSI report is further provided. The device is applied to a base station and includes a determination module, a selection module and a transmission module. The determination module is configured to determine priorities of M CSI reports, where M is a natural number not less than 1. The selection module is configured to select an available channel resource from a channel resource set for receiving the M CSI reports, where the channel resource set includes J channel resources supporting reception of the M CSI reports and J is a natural number not less than 1. The transmission module is configured to receive at least one CSI report according to the priorities by using the available channel resource.

A device for determining a QCL parameter is further provided. The device includes a determination module or a second determination module. The determination module is configured to determine whether configuration information satisfies a predetermined constraint condition, and determine an acquisition mode of a QCL parameter of a signal according to a determination result. The second determination module is configured to determine the acquisition mode of the QCL parameter of the signal according to signaling information.

A device for determining a QCL parameter is further provided. The device includes a determination module.

The determination module is configured to determine a quasi-co-location (QCL) parameter of an aperiodic measurement reference signal according to physical-layer dynamic control signaling, where the physical-layer dynamic control signaling includes configuration information about the QCL parameter of the aperiodic measurement reference signal.

A terminal device is further provided. The terminal device includes a processor and a communication module. The processor is configured to select an available channel resource from a channel resource set for transmitting M CSI reports, where the channel resource set includes J channel resources supporting transmission of the M CSI reports and J is a natural number not less than 1. The communication module is configured to transmit at least one CSI report according to priorities of the M CSI reports by using the available channel resource.

A base station is further provided. The base station includes a processor and a communication module. The processor is configured to determine priorities of M CSI reports, where M is a natural number not less than 1, and select an available channel resource from a channel resource set for receiving the M CSI reports, where the channel resource set includes J channel resources supporting reception of the M CSI reports and J is a natural number not less than 1. The communication module is configured to receive at least one CSI report according to the priorities by using the available channel resource.

An electronic device is further provided. The electronic device includes a memory and a processor. The memory stores computer programs. The processor is configured to execute the computer programs to perform any method for sending a CSI report described above.

An electronic device is further provided. The electronic device includes a memory and a processor. The memory stores computer programs. The processor is configured to execute the computer programs to perform any method for receiving a CSI report described above.

A storage medium is further provided. The storage medium is configured to store computer programs. The computer programs are configured to, when executed, perform the steps of any method embodiment described above.

An electronic device is further provided. The electronic device includes a memory and a processor. The memory stores computer programs. The processor is configured to execute the computer programs to perform the steps of any method embodiment described above.

DETAILED DESCRIPTION

The present disclosure is described hereinafter in detail with reference to the drawings and in conjunction with embodiments.

It is to be noted that the terms "first", "second" and the like in the description, claims and drawings of the present disclosure are used to distinguish between similar objects and are not necessarily used to describe a particular order or sequence.

In the embodiments of the present disclosure, transmission configuration indicator (TCI) information is used for indicating a quasi-co-location (QCL) relationship between a DMRS group/CSI-RS port group and a DL-RS set. That is, each piece of TCI index information corresponds to a respective state, each state includes correspondences between Q DMRS groups and Q DL-RS sets, each DL-RS set includes one or more down link-reference signals (DL-RSs), and each DL-RS is associated with a QCL parameter set, indicating that a reference signal in the DMRS group/CSI-RS port group and a DL-RS in the DL-RS set associated with the DMRS group/CSI-RS port group satisfy a QCL relationship with respect to the QCL parameter set. The case where two reference signals satisfy a quasi-co-location relationship with respect to a QCL parameter indicates that the QCL parameter of a reference signal may be acquired through the QCL parameters of the two reference signals. The QCL parameter includes at least one of a Doppler shift, a Doppler spread, an average delay, a delay spread, an average gain or a spatial Rx parameter.

Embodiment One

Figure 1:
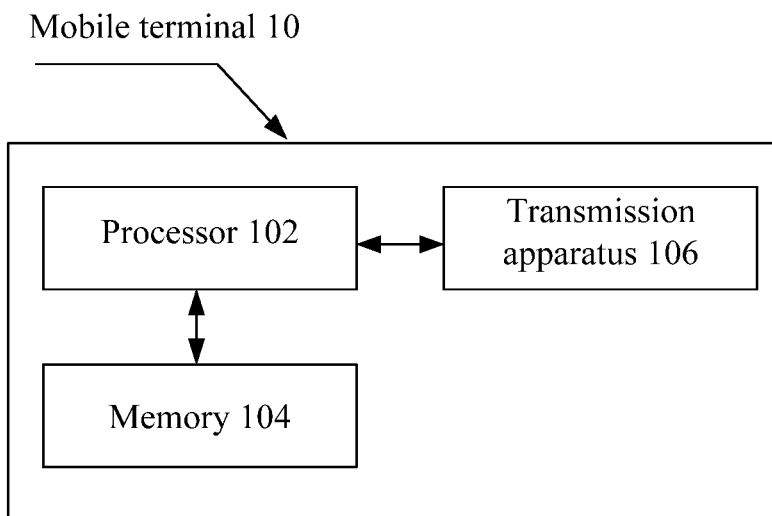
FIG. 1 is a structure block diagram of a terminal device according to an embodiment of the present disclosure.

A method embodiment provided by embodiment one of the present disclosure may be executed in a mobile terminal, a computer terminal or other similar computing devices. Using the method embodiment to be executed in the mobile terminal as an example, FIG. 1 is a structure block diagram of hardware of a mobile terminal for a method for sending a CSI report according to an embodiment of the present disclosure. As shown in FIG. 1, a mobile terminal 10 may include one or more (only one is shown in FIG. 1) processors 102 (where the processor 102 may include, but is not limited to, a microcontroller unit (MCU), a field programmable gate array (FPGA) or another processing device), a memory 104 for storing data, and a transmission device 106 for implementing a communication function. It is to be understood by those skilled in the art that the structure shown in FIG. 1 is merely illustrative, and not intended to limit the structure of the electronic device described above. For example, the mobile terminal 10 may further include more or fewer components than the components shown in FIG. 1, or may have a configuration different from the configuration shown in FIG. 1.

The memory 104 may be configured to store computer programs (such as software programs and modules of application software), for example, computer programs corresponding to the method in the embodiment of the present disclosure. The processors 102 execute the computer programs stored in the memory 104 to perform various functional applications and data processing, that is, to perform the preceding method. The memory 104 may include a high-speed random access memory, or may further include a nonvolatile memory, such as one or more magnetic storage devices, flash memories or other nonvolatile solid-state memories. In some examples, the memory 104 may further include memories that are remotely disposed with respect to the processors 102. These remote memories may be connected to the mobile terminal 10 via a network. Examples of the preceding network include, but are not limited to, the Internet, an intranet, a local area network, a mobile communication network and a combination thereof.

The transmission device 106 is configured to receive or send data via a network. Specific examples of the preceding network may include a wireless network provided by a communication provider of the mobile terminal 10. In an embodiment, the transmission device 106 includes a network interface controller (NIC). The NIC may be connected to other network equipment via a base station and thus communicate with the Internet. In an example, the transmission device 106 may be a radio frequency (RF) module, which is configured to communicate with the Internet in a wireless way.

Figure 2:
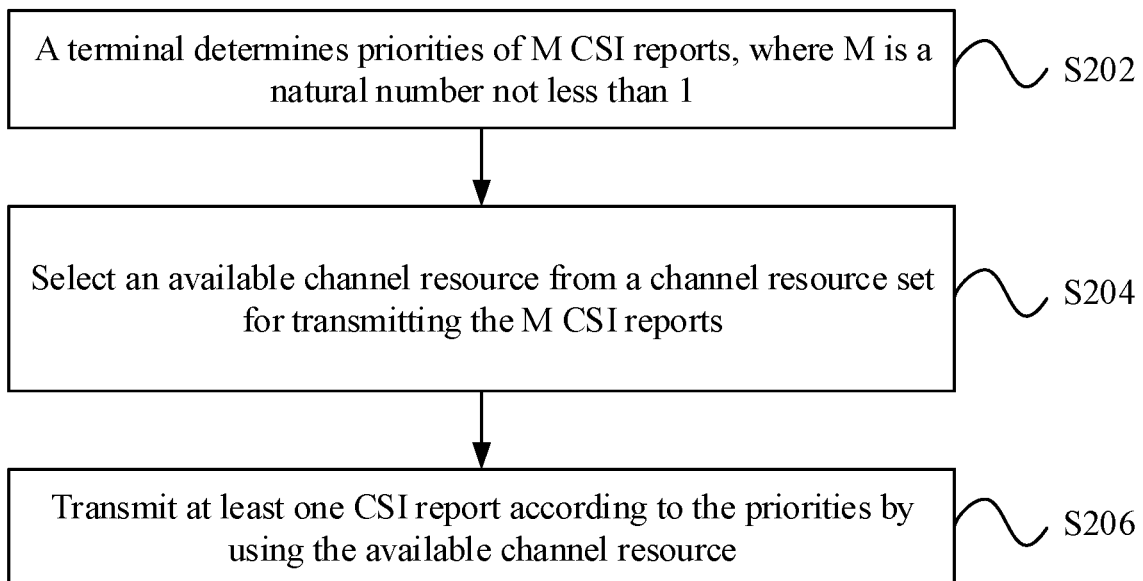
FIG. 2 is a flowchart of a method for sending a CSI report according to an embodiment of the present disclosure.

This embodiment provides a method for sending a CSI report. The method is executed in the preceding mobile terminal. FIG. 2 is a flowchart of the method for sending a CSI report according to the embodiment of the present disclosure. As shown in FIG. 2, the method includes steps S202, S204 and S206 described below.

In step S202, a terminal determines priorities of M CSI reports, where M is a natural number not less than 1.

In step S204, an available channel resource is selected from a channel resource set for transmitting the M CSI reports.

The channel resource set includes J channel resources supporting transmission of the M CSI reports. J is a natural number not less than 1.

In step S206, at least one CSI report is transmitted according to the priorities of the M CSI reports by using the available channel resource.

Step S204 may be performed by: selecting one channel resource from the channel resource set as the available channel resource; or selecting multiple channel resources from the channel resource set to merge the multiple channel resources into a new channel resource, and using the new channel resource to send the CSI report. Details are described blow.

As an exemplary embodiment of the present disclosure, step S204 may be performed by selecting one channel resource from the J channel resources as the available channel resource.

For example, a channel resource occupying a minimum number of resource elements (REs) in an optional channel resource set is used as the available channel resource. The optional channel resource set is a subset of the channel resource set.

In an embodiment, the channel resource occupying the minimum number of REs in the optional channel resource set may be used as the available channel resource according to the following condition: a total overhead of the M CSI reports is less than the maximum number of transmittable bits of any channel resource in the optional channel resource set.

For example, a channel resource R corresponding to the maximum one among maximum numbers of transmittable bits in the channel resource set is selected as the available channel resource.

In an embodiment, the channel resource R is selected as the available channel resource according to the following condition: a total overhead of the M CSI reports is not less than the maximum one among maximum numbers of transmittable bits in the channel resource set.

For another example, if the M CSI reports are sequenced according to the priorities, from high to low, of the M CSI reports, then first K CSI reports are transmitted based on determining that a total overhead of the first K CSI reports is less than or equal to the maximum number Ot of transmittable bits of the one channel resource and a total overhead of first K+1 CSI reports is greater than Ot. K is a natural number not greater than M.

In an embodiment, before the channel resource occupying a minimum number of REs in the optional channel resource set is used as the available channel resource, the following operation may be repeated until the total overhead of the M CSI reports is less than the maximum number of transmittable bits of any channel resource in the optional channel resource set: removing a channel resource whose maximum number of transmittable bits is minimum in the optional channel resource set based on determining that a channel resource whose maximum number of transmittable bits is less than the total overhead of the M CSI reports exists in the optional channel resource set.

In an embodiment, the maximum number of transmittable bits of the one channel resource is determined according to a maximum transmission code rate and the number of occupied REs.

In an embodiment, the maximum number of transmittable bits satisfies at least one of the following conditions: the maximum number of transmittable bits is equal to a difference value between the number of cyclic redundancy check (CRC) bits and a product of the maximum transmission code rate and the number of occupied REs, or the maximum number of transmittable bits is proportional to the product of the maximum transmission code rate and the number of occupied REs.

As another application embodiment, step S204 may further be performed such that: the terminal selects L channel resources from the J channel resources to merge the L channel resources into a new channel resource, and the new channel resource is used as the available channel resource.

An RE set contained in the new channel resource is a union set of RE sets corresponding to the L channel resources, or a subset of the union set.

For example, L0 channel resources are selected from the J channel resources, and the L0 channel resources are used as the available channel resource. The at least one CSI report is transmitted on a union set of RE sets corresponding to the L0 channel resources and at a maximum code rate which is the minimum one among maximum code rates corresponding to the L0 channel resources by using the available channel resource. L0 is a natural number not greater than J.

In an embodiment, the L0 channel resources are selected from the J channel resources in at least one of the following manners: the M CSI reports can be transmitted completely in response to transmitting the CSI on the union set of RE sets corresponding to the L0 channel resources and at the maximum code rate which is the minimum one among the maximum code rates corresponding to the L0 channel resources; the union set of RE sets corresponding to the L0 channel resources occupies a minimum number of REs; the maximum number of transmittable bits is maximum in the transmission on the union set of RE sets corresponding to the L0 channel resources and at the maximum code rate which is the minimum one among the maximum code rates corresponding to the L0 channel resources; or one of time domain symbols or time domain symbol groups occupied by the L0 channel resources are different from each other.

In an embodiment, the CSI reports are transmitted such that all the M CSI reports are transmitted.

Alternatively, the CSI reports are transmitted such that: if the maximum number of transmittable bits is O0 in the transmission on the union set of RE sets corresponding to the L0 channel resources and at the maximum code rate which is the minimum one among the maximum code rates corresponding to the L0 channel resources, then the M CSI reports are sequenced according to the priorities, from high to low, of the M CSI reports, and first K CSI reports are transmitted based on determining that the total overhead of the first K CSI reports is less than or equal to O0 and the total overhead of first K+1 CSI reports is greater than O0, where $1 \leq K \leq M$.

As another application embodiment, L1 channel resources are selected from the J channel resources as the available channel resource, where an RE contained in a channel resource is selected on each time domain symbol contained in RE sets occupied by the L1 channel resources to form a first RE set, and the CSI reports are transmitted on the first RE set at a maximum code rate which is the minimum one among maximum code rates corresponding to the selected channel resources.

For another example, an RE contained in a channel resource having a maximum number of physical resource blocks (PRB) is selected on each time domain symbol to obtain the first RE set.

In an embodiment, the M CSI reports can be transmitted completely in response to transmitting the at least one CSI report on the first RE set at the maximum code rate which is the minimum one among maximum code rates corresponding to the L1 resources, the first RE set occupies a minimum number of REs, or the maximum number of transmittable bits is maximum in the transmission on the first RE set at the maximum code rate which is the minimum one among maximum code rates corresponding to the selected channel resources.

In another application embodiment, if the maximum number of transmittable bits is O1 in the transmission on the first RE at the maximum code rate which is the minimum one among maximum code rates corresponding to the selected channel resources, the M CSI reports are sequenced according to the priorities, from high to low, of the M CSI reports, and first K CSI reports are transmitted based on determining that a total overhead of the first K CSI reports is less than or equal to O1 and a total overhead of first K+1 CSI reports is greater than O1, where $1 \leq K \leq M$.

In an embodiment, the maximum number of transmittable bits of the new channel resource is determined according to a maximum transmission code rate and the number of occupied REs.

In an embodiment, the maximum number of transmittable bits satisfies at least one of the following conditions: the maximum number of transmittable bits is equal to a difference value between the number of cyclic redundancy check (CRC) bits and a product of the maximum transmission code rate and the number of occupied REs, or the maximum number of transmittable bits is proportional to the product of the maximum transmission code rate and the number of occupied REs.

As another exemplary example, an application scenario of this embodiment may be that collision exists between channel resources. That is, before step S202, it is determined that collision exists between at least two channel resources in the channel resource set, where the collision means that the at least two channel resources contain at least one of the same time domain symbol or the same frequency domain subcarrier.

In an embodiment, the J channel resources are within the same slot.

In an embodiment, steps S202 and S204 may be executed in a reverse order, that is, step S204 may be executed before step S202.

Through this embodiment of the present disclosure, CSI reports are transmitted according to priorities of CSI reports by using selected channel resources. This can avoid a problem that the CSI reports cannot be reported due to channel resource collision, thereby improving the transmission efficiency of CSI feedback or improving the utilization ratio of uplink channel resources.

According to the description of the embodiment described above, it is apparent to those skilled in the art that the method in the embodiment described above may be implemented by software plus a necessary general-purpose hardware platform, or may of course be implemented by hardware. However, in many cases, the former is a preferred implementation mode. Based on this understanding, the technical solution of the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to perform the method according to each embodiment of the present disclosure.

Embodiment Two

This embodiment further provides a device for sending a CSI report. The device is configured to implement the embodiment and application implementation mode described above. What has been described is not repeated. As used below, the term "module" may be at least one of software, hardware or a combination thereof that can implement predetermined functions. The device in the embodiment described below is preferably implemented by software, but implementation by hardware or by a combination of software and hardware is also possible and conceivable.

Figure 3:
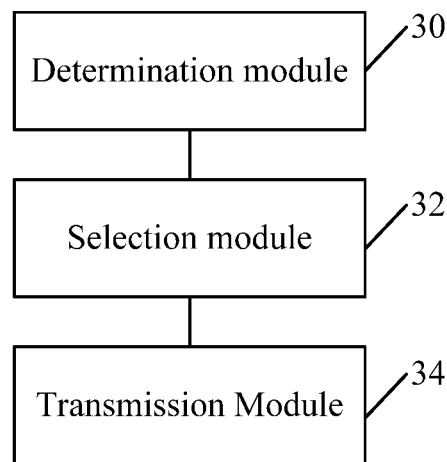
FIG. 3 is a structure block diagram of a device for sending a CSI report according to an embodiment of the present disclosure.

FIG. 3 is a structure block diagram of the device for sending a CSI report according to the embodiment of the present disclosure. The device for sending a CSI report is applied to a terminal. As shown in FIG. 3, the device includes a determination module 30, a selection module 32 and a transmission module 34.

The determination module 30 is configured to determine priorities of M CSI reports, where M is a natural number not less than 1.

The selection module 32 is configured to select an available channel resource from a channel resource set for transmitting the M CSI reports. The channel resource set includes J channel resources supporting transmission of the M CSI reports. J is a natural number not less than 1.

The transmission module 34 is configured to transmit the CSI reports according to the priorities by using the available channel resource.

In an embodiment, the determination module 30 is further configured such that collision exists between at least two channel resources in the channel resource set. The collision means that the at least two channel resources contain at least one of the same time domain symbol or the same frequency domain subcarrier.

It is to be noted that the preceding modules may be implemented by software or hardware. Implementation by hardware may, but not necessarily, be performed in the following manner: the preceding modules are located in the same processor or the preceding modules are located in any combination in their respective processors.

The related solutions in embodiment one and embodiment two are described in detail below in conjunction with examples 3 to 6.

Embodiment Three

This embodiment gives an example for implementing CSI feedback. During the CSI feedback, a terminal transmits a CSI report on an uplink channel resource corresponding to the CSI report. The uplink channel resource may be a physical uplink control channel (PUCCH) resource or a physical uplink shared channel (PUSCH) resource. If there are multiple CSI reports, the terminal transmits each CSI report on a respective uplink channel resource corresponding to the each CSI report. In response to collision existing between at least two channel resources in a slot, the terminal cannot transmit each CSI report on the respective uplink channel resource. The collision means that the at least two channel resources contain at least one of the same time domain symbol or the same frequency domain subcarrier.

For example, in one slot, the terminal is configured with J (J≥2) channel resources for reporting the CSI, and collision exists between at least two channel resources in the J channel resources. A base station configures corresponding transmission mode information, which includes maximum code rate information, for the J channel resources. For example, in the J channel resources, the maximum transmission code rate of the j-th channel resource Rj is Cj, the number of REs occupied by the j-th channel resource is Nj, and the set of the occupied REs is REj, then the maximum number of transmittable bits of the j-th channel resource is Oj, where Oj may be calculated from Cj and Nj. For example, Oj is proportional to CjNj ($O_j \propto C_j N_j$). In the case where the collision exists between the at least two channel resources in the slot, the terminal may transmit the CSI reports in at least one of the manners described below.

Manner 1: The terminal determines priorities of CSI reports to be transmitted. For example, there are M (M≥1) CSI reports to be transmitted, and the M CSI reports are sequenced as P1, P2, . . . , PM according to priorities of the M CSI reports from high to low. One channel resource is selected from J channel resources. CSI reports are reported as many as possible on the one channel resource according to the priorities from high to low. Exemplarily, the specific method includes steps 0 to 2 described below.

In step 0, an optional channel resource set is {R1, . . . , RJ}.

In step 1, if a total overhead of the M CSI reports P1, P2, . . . and PM is less than the maximum number of transmittable bits of any channel resource in the optional channel resource set, then at least one CSI report is transmitted on a channel resource that occupies a minimum number of REs in the optional channel resource set; if there is a channel resource whose maximum number of transmittable bits is less than or equal to the total overhead of the M CSI reports in the optional channel resource set, a channel resource whose maximum numbers of transmittable bits is minimum is removed from the optional channel resource set, and step 1 is continued.

In step 2, if the total overhead of the M CSI reports P1, P2, . . . and PM is not less than a maximum number of transmittable bits of a channel resource whose maximum number of transmittable bits is maximum in {R1, . . . , RJ}, then the channel resource whose maximum number of transmittable bits is maximum is selected to report K CSI reports among the M CSI reports. For example, for the channel resource Rt whose maximum number of transmittable bits is maximum, if K satisfies that a total overhead of CSI {P1, . . . , PK} is less than or equal to Ot and a total overhead of CSI {P1, . . . , PK+1} is greater than Ot, then CSI {P1, . . . , PK} are transmitted on this channel resource Rt.

Manner 2: The terminal determines priorities of CSI reports to be transmitted. For example, there are M (M≥1) CSI reports to be transmitted and the M CSI reports are sequenced as P1, P2, . . . and PM according to priorities of the M CSI reports from high to low. One or more channel resources are selected from the J channel resources. CSI reports are reported as many as possible on the one or more channel resources according to the priorities from high to low. The specific method includes steps A and B described below.

In step A, L0 channel resources are selected from {R1, . . . , RJ}, and if the M CSI reports can be transmitted completely and a minimum number of REs is occupied in response to transmitting the CSI reports on REs contained in a new channel resource merged by the L0 resources (that is, a union set of the L0 RE sets) and at a code rate which is the minimum one among maximum code rates corresponding to the L0 resources, then the L0 channel resources are selected to transmit the at least one CSI report at the code rate which is the minimum one among the maximum code rates corresponding to the L0 resources. For example, if $$\{L, R_{i_1}, \ldots, R_{i_L}\} | \left( \{L, R_{i_1}, \ldots, R_{i_L}\} = \{L_0, R_{j_1}, \ldots, R_{j_{L_0}}\} \right)$$

satisfies that the M CSI reports can be transmitted completely on $\bigcup_{l=1}^{L_0} RE_{j_l}$ at a code rate of $$\min\{C_{j_1}, \ldots, C_{j_{L_0}}\}$$

and $$\min_{L, R_{i_1}, R_{i_L}}$$

$N(U_{l=1}{}^L RE_{i_l})$ is achieved, then the CSI reports are transmitted on $U_{l=1}{}^{L_0} RE_{j_l}$ at $$\min\{(C_{j_1}, \ldots, C_{j_{L_0}}\},$$

where $1 \leq L \leq 5$ J, $i_1 \in \{1, \ldots, J\}$, $U_{l=1}{}^L RE_{i_l}$ denotes the union set of the L RE sets, and $N(U_{l=1}{}^L RE_{i_l})$ denotes the number of REs contained in the union set.

In step B, if the L0 resource channels satisfying the conditions cannot be found in step A, then L1 channel resources are selected from {R1, ..., RJ} so that the maximum number of transmittable bits is maximum in response to transmitting the CSI reports on REs contained in a new channel resource merged by the L0 resources (that is, a union set of the L0 RE sets) at a code rate which is the minimum one among maximum code rates corresponding to the L1 resources, and K CSI reports among the M CSI reports are reported. For example, in response to transmitting the CSI reports on the mergence channel resource at the code rate which is the minimum one among maximum code rates corresponding to the L1 resources, if K satisfies that a total overhead of CSI{P1, ..., PK} is less than or equal to the maximum number O0 of transmittable bits after the mergence and a total overhead of CSI{P1, ..., PK+1} is greater than O0, then CSI{P1, ..., PK} is transmitted on the mergence channel resource at the code rate which is the minimum one among maximum code rates corresponding to the L1 resources. For example, $$\{L, R_{i_1}, \ldots, R_{i_L}\} \big| (\{L, R_{i_1}, \ldots, R_{i_L}\} = \{L_1 R_{k_1}, \ldots, R_{k_{L_1}}\})$$

satisfies:

$$\max_{L, R_{i_1}, \ldots, R_{i_L}} O\left(\bigcup_{l=1}^L RE_{i_l}\right),$$

where $o(U_{l=1}{}^L RE_{i_l})$ denotes the maximum number of transmittable bits on $U_{l=1}{}^L RE_{i_l}$ at $\min\{C_{i_1}, \ldots, C_{i_L}\}$, that is, $O(U_{l=1}{}^L RE_{i_l}) \propto N(U_{l=1}{}^L RE_{i_l}) \cdot \min\{C_{i_1}, \ldots, C_{i_L}\}$; if K satisfies that a total overhead of CSI{P1, ..., PK} is less than or equal to the maximum number $O(U_{l=1}{}^{L_1} \% RE_{k_l})$ of transmittable bits after the mergence and a total overhead of CSI{P1, ..., PK+1} is greater than $O(U_{l=1}{}^{L_1} RE_{k_l})$, then CSI{P1, ..., PK} is transmitted on $U_{l=1}{}^{L_1} RE_{k_l}$ at $$\min\{C_{k_1}, \ldots, C_{k_{L_1}}\}.$$

In the preceding manner 1 or manner 2, if the corresponding maximum numbers of bits are the same or the minimum numbers of REs are the same, then a channel resource having a lower resource ID is selected.

In the preceding manner 2, the channel resource selected for the mergence may be at least one of a periodic channel resource, a semi-persistent channel resource or an aperiodic channel resource.

Embodiment Four

This embodiment provides an application implementation mode for processing a demodulation reference signal (DMRS) corresponding to a channel resource in the selection of the channel resource in CSI feedback. In embodiment three, for manner 2, if there are multiple channel resources for transmitting and reporting CSI in a slot and collision exists between at least two channel resources, multiple channel resources may be selected and merged into a new channel resource for transmitting the CSI. During the channel resource mergence, if multiple channel resources partially overlap in the frequency domain, it is necessary to solve the problem of how to process DMRSs corresponding to these channel resources. At least one of the manners described below may be used to solve the preceding problem.

Figure 4:
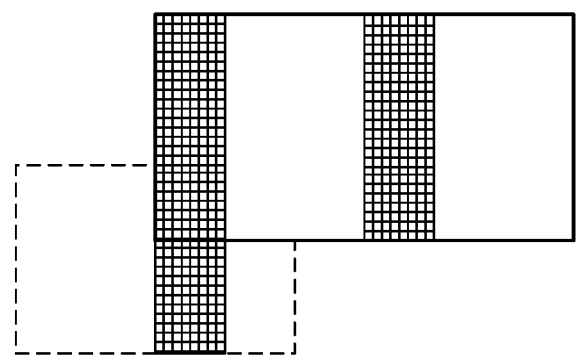
FIG. 4 is a schematic diagram of example 1 of resource mergence and DMRS locations according to an embodiment of the present disclosure.

In manner A1, positions of time domain symbols of a DMRS are determined. On a set of time domain symbols occupied by a mergence channel resource, one time domain symbol of the DMRS is contained every T time domain symbols. For example, the time domain symbols of the DMRS are located on the T-th, 2T-th, 3T-th and other time domain symbols. The value of T may be fixed, for example, T=3, or determined by a configuration of higher-layer signaling, or determined according to the maximum value or the minimum value of the time domain density of the DMRS of channel resources before the mergence. As shown in FIG. 4, time domain symbols of the DMRS are placed at fixed symbol intervals in a mergence time domain area of resource 1 and resource 2.

Figure 5:
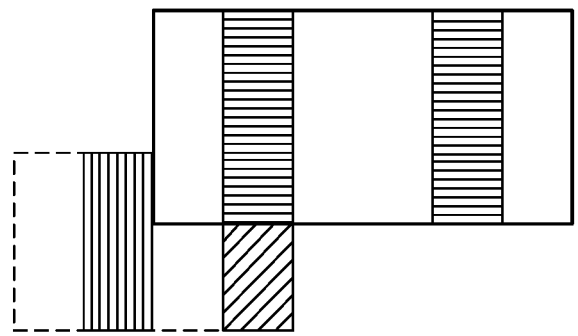
FIG. 5 is a schematic diagram of example 2 of resource mergence and DMRS locations according to an embodiment of the present disclosure.

In manner A2, positions of time domain symbols of a DMRS are determined. A mergence channel resource includes L channel resources before the mergence, and time domain symbols of the DMRS after the mergence are located on a union set of time domain symbols of DMRSs of the L resources. As shown in FIG. 5, in a mergence time domain area of resource 1 and resource 2, DMRS symbols of the mergence resource include a union of a DMRS symbol set of resource 1 and a DMRS symbol set of resource 2.

In manner B1, a frequency domain structure of a DMRS is determined. According to the positions of time domain symbols of the DMRS determined in manner A1 or manner A2, if the mergence channel resource contains F subcarriers at these positions, then a DMR sequence having a frequency domain length of F is generated and mapped on F subcarriers corresponding to the time domain positions. As shown in FIG. 4 or FIG. 5, on corresponding areas of the DMRS symbols, the DMRS having the corresponding length is generated according to the number of subcarriers contained in corresponding symbols of the mergence channel resource, and the DMRS is mapped to corresponding frequency domain areas.

Figure 6:
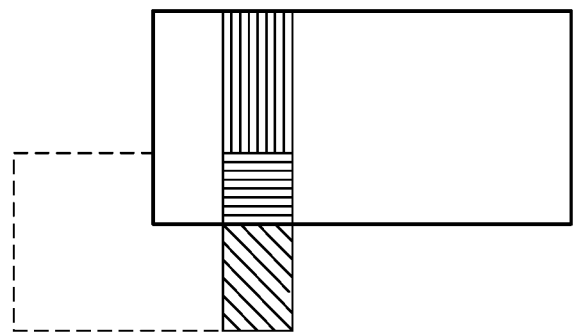
FIG. 6 is a schematic diagram of frequency domain segments of a DMRS and resources according to an embodiment of the present disclosure.

In manner B2, a frequency domain structure of a DMRS is determined. This step is performed by segmentation and cascade of DMRSs in frequency domain. For example, for channel resources partially overlapping in the frequency domain, the mergence channel resource is divided into T segments in the frequency domain according to overlapping parts, and the length of the t-th segment is St. T DMRS sequences are generated at the time domain positions determined in manner A1 or manner A2, and the length of the t-th DMRS sequence is St. As shown in FIG. 6, the DMRS of the mergence resource are formed by three DMRS segments generated in an area belonging to only resource 1, an area belonging to only resource 2, and an overlapping area, and the DMRS on the whole symbol is cascaded of the three DMRS segments.

Figure 7:
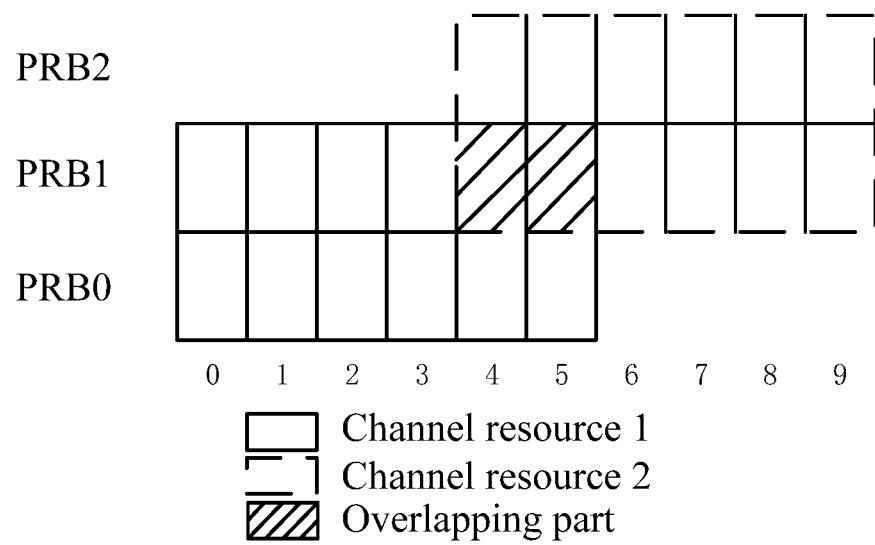
FIG. 7 is a schematic diagram of an example for processing a DMRS in channel resource mergence according to an embodiment of the present disclosure.

In manner B3, priorities of channel resources before the mergence are specified, where the priorities may be determined by at least one of: determining according to a channel format (for example, more orthogonal frequency division multiplexing (OFDM) symbols a resource contains, the higher priority the resource has), selecting according to the Identity (ID) of the channel resource (for example, a resource with the lowest or highest ID has a higher priority), and selecting according to the corresponding code rate (for example, a resource with the lowest or highest code rate has a higher priority); a DMRS of a channel resource with a higher priority is still generated in the way before the mergence; an overlapping part of a DMRS of a channel resource with a lower priority is removed, and the number of occupied physical resource blocks (PRBs), subcarriers or OFDM symbols is reduced. That is, at least one of the length or the time domain density of the DMRS is generated according to the conditions after the removal. A specific example is shown in FIG. 7. If channel resource 1 has a higher priority, PRB1 of channel resource 2 is removed and a DMRS of channel resource 2 is generated according to the length of a PRB.

Embodiment Five

This embodiment gives an application implementation mode for selecting a channel resource in CSI feedback. In embodiment three, manner 2 includes a method of merging multiple channel resources and transmitting CSI on a mergence channel resource. It is necessary to make some improvements if a terminal is limited to transmit only one channel resource on the same time domain symbol.

In a slot, the terminal is configured with J (J≥2) channel resources for reporting the CSI, and collision exists between at least two channel resources among the J channel resources. A base station configures corresponding transmission mode information, including maximum code rate information, for the J channel resources. For example, in the J channel resources, the maximum transmission code rate of the j-th channel resource Rj is Cj, the number of REs occupied by the j-th channel resource is Nj, and the set of the occupied REs is REj, then the maximum number of transmittable bits of the j-th channel resource is Oj, where Oj may be calculated from Cj and Nj. For example, $O_j \propto C_j N_j$. In the case where the collision exists between the at least two channel resources in the slot, the terminal may transmit CSI reports in at least one of the manners described below.

Manner I: The terminal determines priorities of CSI reports to be transmitted. For example, there are M (M≥1) CSI reports to be transmitted, and the M CSI reports are sequenced as P1, P2, . . . and PM according to priorities of the M CSI reports from high to low. One or more channel resources are selected from the J channel resources. CSI reports are reported as many as possible on the one or more channel resources according to the priorities from high to low. The specific method includes steps I-A and I-B described below.

Figure 8:
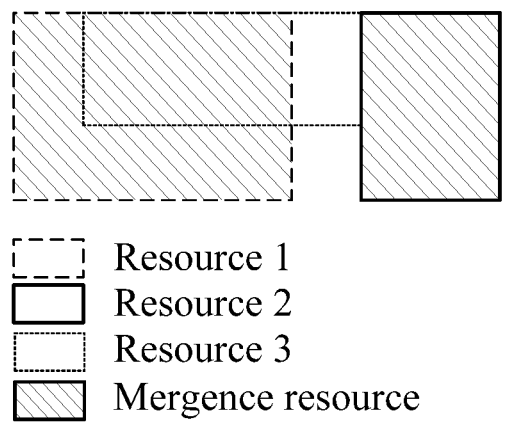
FIG. 8 is a schematic diagram of an example of channel resource mergence according to an embodiment of the present disclosure.

In step I-A, L0 channel resources are selected from {R1, . . . , RJ}, where the L0 channel resources are located at different time domain symbols or different time domain symbol groups, that is, the L0 channel resources do not contain the same time symbol; as show in FIG. 8, if the M CSI reports can be transmitted completely and a minimum number of REs is occupied in response to transmitting the CSI reports on REs contained in a new channel resource merged by the L0 resources (that is, a union set of the L0 RE sets) at a code rate which is the minimum one among maximum code rates corresponding to the L0 resources, then the L0 channel resources are selected to transmit the CSI reports at a code rate which the minimum one among maximum code rates corresponding to the L0 resources. For example, if $$\{L, R_{i_1}, \ldots, R_{i_L}\}$$

$$(\{L, R_{i_1}, \ldots, R_{i_L}\} = \{L_0, R_{j_1}, \ldots, R_{j_{L_0}}\})$$

satisfies that resources in $$\{R_{j_1}, \ldots, R_{j_{L_0}}\}$$

do not contain the same time symbol, and the M CSI reports can be transmitted completely on $U_{l=1}^{L_0} RE_{j_1}$ at a code rate of $$\min\{C_{j_1}, \ldots, C_{j_{L_0}}\}$$

so that $$\min_{L, R_{i_1}, \ldots, R_{i_L}} N\left(\bigcup_{l=1}^{L} RE_{i_1}\right),$$

then the CSI reports are transmitted on $U_{l=1}^{L_0} RE_{j_1}$ at $$\min\{C_{j_1}, \ldots, C_{j_{L_0}}\},$$

where 1≤L≤J, $i_1 \in \{1, \ldots, J\}$, $U_{l=1}^{L} RE_{i_1}$ denotes a union set of L RE sets, and $N(U_{l=1}^{L} RE_{i_1})$ denotes the number of REs contained in the union set.

In step I-B, if the L0 resource channels satisfying the conditions cannot be found in step I-A, then L1 channel resources are selected from {R1, . . . , RJ}, where the L1 channel resources are located at different time domain symbols or different time domain symbol groups, that is, the L1 channel resources do not contain the same time domain symbol, so that the maximum number of transmittable bits is maximum in response to transmitting the CSI reports on REs contained in a new channel resource merged by the L1 resources (that is, a union set of the L1 RE sets) and at a code rate which is the minimum one among maximum code rates corresponding to the L1 resources, and K CSI reports among the M CSI reports are reported. For example, in response to transmitting the CSI reports on the mergence channel resource at the code rate which is the minimum one among maximum code rates corresponding to the L1 resources, if K satisfies that a total overhead of CSI{P1, . . . , PK} is less than or equal to the maximum number O0 of transmittable bits after the mergence and a total overhead of CSI{P1, . . . , PK+1} is greater than O0, then CSI{P1, . . . , PK} are transmitted on the mergence channel resource at the code rate which is the minimum one among maximum code rates corresponding to the L1 resources. For example, $$\{L, R_{i_1}, \ldots, R_{i_L}\} | (\{L, R_{i_1}, \ldots, R_{i_L}\} = \{L_1 R_{k_1}, \ldots, R_{k_{L_1}}\})$$

satisfies that resources in $\{L, R_{i_1}, \ldots, R_{i_L}\}$ do not contain the same time domain symbol or the same time domain symbol group so that $$\max_{L, R_{i_1}, \ldots, R_{i_L}} O\left(\bigcup_{l=1}^{L} RE_{i_1}\right),$$

where $O(U_{l=1}^{L} RE_{i_1})$ denotes the maximum number of transmittable bits of $U_{l=1}^{L} RE_{i_1}$ at $\min\{C_{i_1}, \ldots, C_{i_L}\}$, that is, $O(U_{l=1}^{L} RE_{i_1}) \propto N(U_{l=1}^{L} RE_{i_1}) \cdot \min\{C_{1_1}, \ldots, C_{i_L}\}$; if K satisfies that a total overhead of CSI{P1, . . . , PK} is less than or equal to the maximum number $O(Uh_{l=1}^{L_1} RE_{k_1})$ of transmittable bits after the mergence and a total overhead of CSI{P1, . . . , PK+1} is greater than $O(U_{l=1}^{L_1} RE_{k_1})$, then CSI{P1, . . . , PK} are transmitted on $U_{l=1}^{L_1} RE_{k_1}$ at $$\min\{C_{k_1}, \ldots, C_{k_{L_1}}\}.$$

Manner II: The terminal determines priorities of CSI reports to be transmitted, for example, there are M (M≥1) CSI reports to be transmitted and the M CSI reports are sequenced as P1, P2, . . . and PM according to priorities of the M CSI reports from high to low. One or more channel resources are selected from the J channel resources, and CSI reports are reported as many as possible on the one or more channel resources according to the priorities from high to low. The specific method includes steps II-A and II-B described below.

Figure 9:
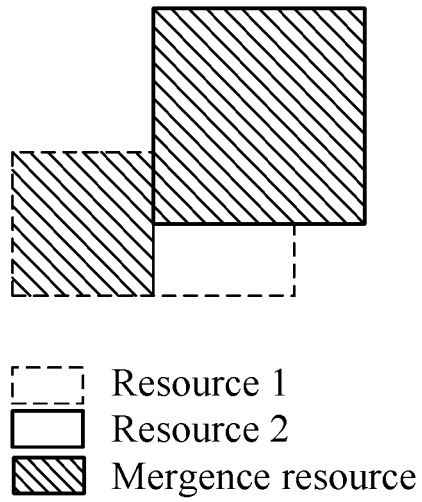
FIG. 9 is a schematic diagram of another example of channel resource mergence according to an embodiment of the present disclosure.

In step II-A, L0 channel resources are selected from {R1, . . . , RJ} and merged into a new channel resource, where an RE contained in one channel resource is selected on each time domain symbol contained in L RE sets (for example, an RE contained in a channel resource having a maximum PRBs is selected on each time domain symbol) to form an RE set contained in the new channel resource; as show in FIG. 9, if the M CSI reports can be transmitted completely and a minimum number of REs is occupied in response to transmitting the CSI reports at a code rate which is the minimum one among maximum code rates corresponding to the selected resources, then the L0 channel resources are selected to transmit the CSI at the code rate which is the minimum one among maximum code rates corresponding to the L0 resources. For example, if $$\{L, R_{i_1}, \ldots, R_{i_L}\} | (\{L, R_{i_1}, \ldots, R_{i_L}\} = \{L_0, R_{j_1}, \ldots, R_{j_{L_0}}\})$$

satisfies that the M CSI reports can be transmitted completely on an RE set $$G(RE_{j_1}, RE_{j_2}, \ldots, RE_{j_{L_0}})$$

at a code rate of $$\min\{C_{j_1}, \ldots, C_{j_{L_0}}\}$$

so that $$\min_{L, R_{i_1}, \ldots, R_{i_L}} N(G(RE_{i_1}, RE_{i_2}, \ldots RE_{i_L})),$$

then the CSI reports are transmitted on $$N(G(RE_{j_1}, RE_{j_2}, \ldots, RE_{j_{L_0}}))$$

at the code rate of $$\min\{C_{j_1}, \ldots, C_{j_{L_0}}\},$$

where $1 \leq L \leq J$, $i_l \in \{1, \ldots, J\}$, $G(RE_{i_1}, RE_{i_2}, \ldots, RE_{i_L})$ denotes a union set of L RE sets, where an RE contained in a channel resource is selected on each time domain symbol contained in the L RE sets (for example, an RE contained in a channel resource having a maximum number of PRBs is selected on each time domain symbol) to form the union set, and $N(G(RE_{i_1}, RE_{i_2}, \ldots, RE_{i_L}))$ denotes the number of REs contained in the union set.

In step II-B, if the L0 resource channels satisfying the conditions cannot be found in step II-A, then L1 channel resources are selected from {R1, . . . , RJ} and merged into a new channel, where an RE contained in one channel resource is selected on each time domain symbol contained in L RE sets (for example, an RE contained in a channel resource having a maximum number of PRBs is selected on each time domain symbol) to form an RE set contained in the new channel resource, so that the maximum number of transmittable bits is maximum in response to transmitting the CSI reports on REs contained in the new mergence channel resource at a code rate which is the minimum one among maximum code rates corresponding to the selected resources, and K CSI reports of the M CSI reports are reported. For example, in response to transmitting the CSI reports on the mergence channel resource at the code rate which is the minimum one among maximum code rates corresponding to the L1 resources, if K satisfies that a total overhead of CSI{P1, . . . , PK} is less than or equal to the maximum number O0 of transmittable bits after the mergence and a total overhead of CSI{P1, . . . , PK+1} is greater than O0, then CSI{P1, . . . , PK} are transmitted on the mergence channel resource at the code rate which is the minimum one among maximum code rates corresponding to the L1 resources. For example, $$\{L, R_{i_1}, \ldots, R_{i_L}\} | (\{L, R_{i_1}, \ldots, R_{i_L}\} = \{L_1, R_{k_1}, \ldots, R_{k_{L_i}}\})$$

satisfies $$\max_{L,R_{i_1},\ldots,R_{i_L}} O\left(\bigcup_{l=1}^{L} RE_{i_1}\right),$$

where $O(G(RE_{i_1}, RES_{i_2}, \ldots, RE_{i_L}))$ denotes the maximum number of transmittable bits of $G(RE_{i_1}, RE_{i_2}, \ldots, RE_{i_L})$ at a code rate of $\min\{C_{i_1}, \ldots, C_{i_L}\}$, that is, $O(U_{l=1}^{L}RE_{i_l}) \propto N (U_{l=1}^{L} RE_{i_l}) \cdot \min\{C_{i_1}, \ldots, C_{i_L}\}$; if K satisfies that a total overhead of CSI{P1, ..., PK} is less than or equal to the maximum number $$O(G(RE_{j_1}, RE_{j_2}, \ldots, RE_{j_{L_1}}))$$

of transmittable bits after the mergence and a total overhead of CSI{P1, ..., PK+1} is greater than $$O(G(RE_{j_1}, RE_{j_2}, \ldots, RE_{j_{L_1}})),$$

then CSI{P1, ..., PK} is transmitted on $$G(RE_{j_1}, RE_{j_2}, \ldots, RE_{j_{L_1}})$$

at the code rate of $$\min\{C_{k_1}, \ldots, C_{k_{L_1}}\}.$$

For the preceding manner II, a possible optimization is to define that an RE set of each selected channel resource in includes at least one column of DMRSs.

In the preceding manner I or manner II, if corresponding maximum numbers of bits are the same or minimum numbers of REs are the same, a channel resource having a lower resource ID is selected.

In the preceding manner II, the channel resource selected for the mergence may be at least one of a periodic channel resource, a semi-persistent channel resource or an aperiodic channel resource.

Embodiment Six

This embodiment provides a specific implementation mode for processing spatial information corresponding to a channel resource during the selection of the channel resource in CSI feedback. In embodiment three or embodiment five, the method of CSI feedback on multiple channel resources relates to a manner of merging multiple channel resources into a new channel resource for transmitting CSI. For each channel resource, a terminal is configured with spatial information corresponding to each channel resource. It is necessary to solve the problem of how to process the spatial information corresponding to the mergence channel resource. The preceding problem may be solved in at least one of the manners described below.

Manner 1: It is assumed that one or more channel resources configured for the terminal is configured to have the same spatial information on the same OFDM symbol.

Manner 2: The terminal selects spatial information about one of the multiple channel resources before the mergence, and uses this spatial information as a spatial relationship of the mergence channel resource. For example, the spatial relationship of the mergence channel resource may be selected according to at least one of a channel format (for example, a resource containing a maximum number of OFDM symbols is preferably selected), a channel resource ID (for example, a resource having the lowest or highest ID is selected), a corresponding code rate (for example, a resource having the lowest or highest code rate is selected), or the like.

Manner 3: The spatial information about multiple mergence channel resources includes the spatial information about the multiple channel resources before the mergence.

Manner 4: A mergence channel resource belonging to an overlapping part of the resources before the mergence is configured with spatial information about one of the mergence channel resources belonging to the overlapping part of the resources before the mergence. For example, the spatial information may be selected according to at least one of a channel format (for example, a resource containing a maximum OFDM symbols is preferably selected), a channel resource ID (for example, a resource having the lowest or highest ID is selected), or a code rate (for example, a resource having the lowest or highest code rate is selected). A channel resource out of the overlapping part of the resources before the mergence is configured with spatial information corresponding to a respective resource before the mergence.

Manner 5: During the mergence of the channel resources, only channel resources corresponding to the same spatial information are selected and merged.

Embodiment Seven

Figure 10:
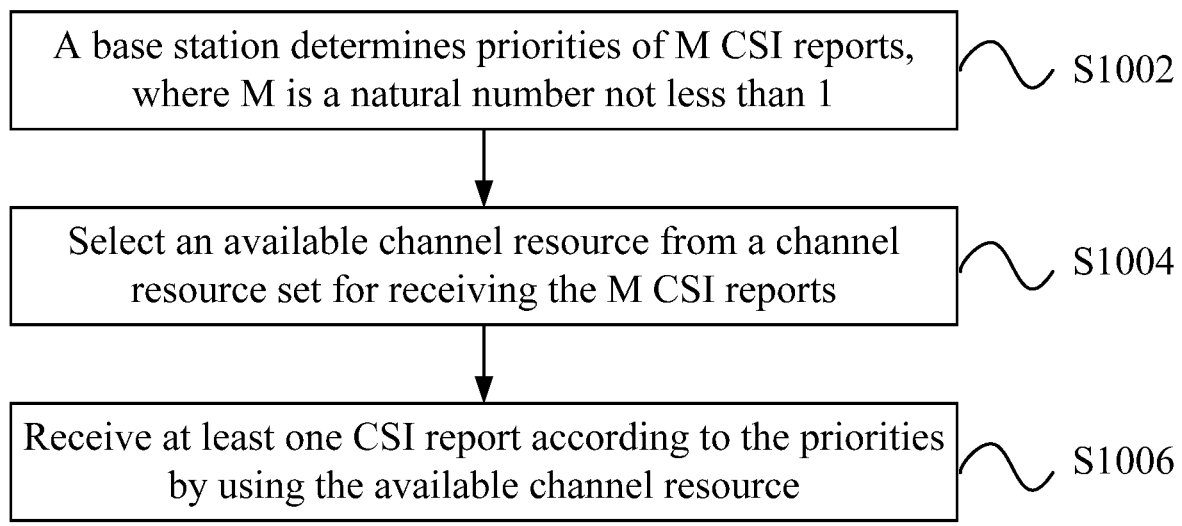
FIG. 10 is a flowchart of a method for receiving a CSI report according to an embodiment of the present disclosure.

FIG. 10 is a flowchart of a method for receiving a CSI report according to an embodiment of the present disclosure. As shown in FIG. 10, the method includes steps S1002, S1004 and S1006.

In step S1002, a base station determines priorities of M CSI reports, where M is a natural number not less than 1.

In step S1004, an available channel resource is selected from a channel resource set for receiving the M CSI reports, where the channel resource set includes J channel resources supporting reception of the M CSI reports and J is a natural number not less than 1.

In step S1006, the M CSI reports are received according to the priorities by using the available channel resource.

It is to be noted that steps S1002 and S1004 may be performed in an optional sequence. For example, step S1004 may be performed before step S1002.

In an embodiment, step S1004 may be performed by selecting one channel resource from the J channel resources as the available channel resource.

For example, a channel resource occupying a minimum number of resource elements (REs) in an optional channel resource set is used as the available channel resource. The optional channel resource set is a subset of the channel resource set.

For another example, a channel resource R corresponding to the maximum one among maximum numbers of transmittable bits in the channel resource set is selected as the available channel resource.

For another example, if the M CSI reports are sequenced according to the priorities from high to low, then first K CSI reports are transmitted based on determining that a total overhead of first K CSI reports is less than or equal to the maximum number Ot of transmittable bits of the one channel resource and a total overhead of first K+1 CSI reports is greater than Ot. K is a natural number not greater than M.

In an embodiment, step S1004 may further be performed such that: the base station selects L channel resources from the J channel resources to merge the L channel resources into a new channel resource, and the new channel resource is used as the available channel resource. An RE set contained in the new channel resource is a union set of RE sets corresponding to the L channel resources, or a subset of the union set.

For example, L0 channel resources are selected from the J channel resources, and the L0 channel resources are used as the available channel resource. The at least one CSI report is transmitted on the available channel resource containing a union set of RE sets corresponding to the L0 channel resources and at a maximum code rate which is the minimum one among maximum code rates corresponding to the L0 channel resources. L0 is a natural number not greater than J.

For another example, L1 channel resources are selected from the J channel resources as the available channel resource, an RE contained in a channel resource is selected on each time domain symbol contained in RE sets occupied by the L1 channel resources to form a first RE set, and the CSI reports are transmitted on the first RE set at a maximum code rate which is the minimum one among maximum code rates corresponding to the selected channel resources.

In an embodiment, collision exists between at least two channel resources in the channel resource set. The collision means that the at least two channel resources contain at least one of the same time domain symbol or the same frequency domain subcarrier.

In an application embodiment, the J channel resources are within the same slot.

It is to be noted that for preferable implementation modes of this embodiment, reference may be made to the related description in embodiments one to six, which is not repeated here.

Embodiment Eight

Figure 11:
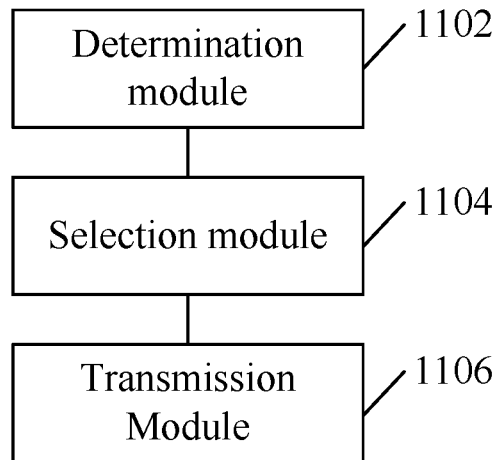
FIG. 11 is a structure block diagram of a device for receiving a CSI report according to an embodiment of the present disclosure.

This embodiment of the present disclosure provides a device for receiving a CSI report. The device is applied to a base station. FIG. 11 is a structure block diagram of a device for receiving a CSI report according to an embodiment of the present disclosure. As shown in FIG. 11, the device includes a determination module 1102, a selection module 1104 and a transmission module 1106.

The determination module 1102 is configured to determine priorities of M CSI reports, where M is a natural number not less than 1. The selection module 1104 is configured to select an available channel resource from a channel resource set for receiving the M CSI reports, where the channel resource set includes J channel resources supporting reception of the M CSI reports and J is a natural number not less than 1. The transmission module 1106 is configured to receive the CSI reports according to the priorities by using the available channel resource.

In an embodiment, the determination module 1102 is further configured such that collision exists between at least two channel resources in the channel resource set. The collision means that the at least two channel resources contain at least one of the same time domain symbol or the same frequency domain subcarrier.

It is to be noted that for implementation modes of this embodiment, reference may be made to the related description in embodiments one to seven, which is not repeated here.

Embodiment Nine

Figure 12:
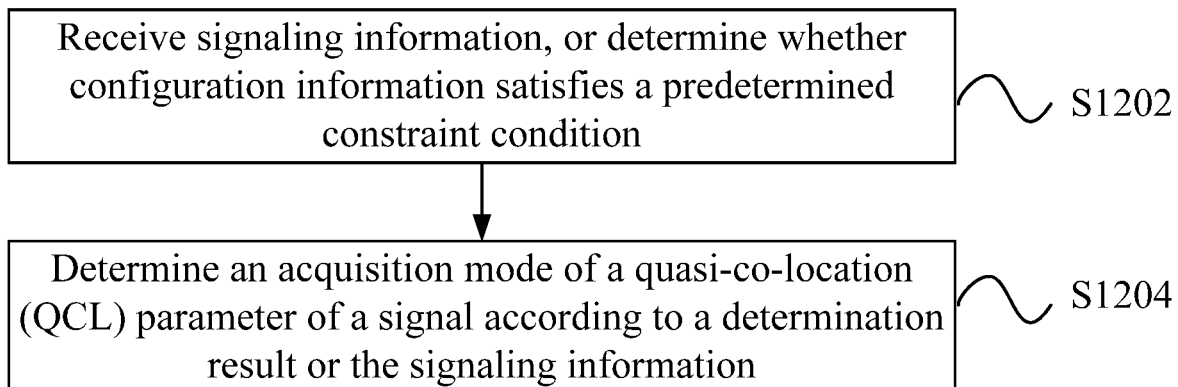
FIG. 12 is a flowchart of a method for determining a QCL parameter according to an embodiment of the present disclosure.

FIG. 12 is a flowchart of a method for determining a QCL parameter according to an embodiment of the present disclosure. As shown in FIG. 12, the method includes steps S1202 and S1204 described below.

In step S1202, signaling information is received, or it is determined whether configuration information satisfies a predetermined constraint condition.

In step S1204, an acquisition mode of a quasi-co-location (QCL) parameter of a signal is determined according to a determination result or the signaling information.

In an embodiment, the acquisition mode includes at least a first acquisition mode and a second acquisition mode.

In the first acquisition mode, an acquisition parameter of the QCL parameter of the signal does not include a relationship between a predetermined threshold and a transmission interval between the signal and physical-layer dynamic control signaling.

In the second acquisition mode, the acquisition parameter of the QCL parameter of the signal includes the relationship between the predetermined threshold and the transmission interval between the signal and the physical-layer dynamic control signaling.

In an embodiment, the acquisition mode includes a third acquisition mode and a fourth acquisition mode. In each of the third acquisition mode and the fourth acquisition mode, the acquisition parameter of the QCL parameter of the signal includes the relationship between the predetermined threshold and the transmission interval between the signal and the physical-layer dynamic control signaling.

In the acquisition mode, the predetermined threshold includes a value less than or equal to 0.

In the fourth acquisition mode, the predetermined threshold includes a value greater than 0.

In an embodiment, the acquisition mode includes at least a fifth acquisition mode and a sixth acquisition mode.

In the fifth acquisition mode, the QCL parameter is acquired according to the physical-layer dynamic control signaling.

In the sixth acquisition mode, whether the QCL parameter of the signal is acquired according to the physical-layer dynamic control signaling or according to a QCL parameter having lowest control source set identification (CORESETID) is determined according to the relationship between the predetermined threshold and the transmission interval between the signal and the physical-layer dynamic control signaling.

In an embodiment, the predetermined constraint condition includes at least one of the following conditions: a carrier frequency where the signal is located is less than a predetermined threshold.

A control resource set (CORESET) configured with a spatial Rx parameter does not exist in a CORESET set to be detected by a first communication node.

A CORESET configured with a spatial Rx parameter does not exist in a CORESET set associated with a dedicated search space to be detected by the first communication node.

A time unit closest to the signal has a CORESET with the lowest CORESETID, but does not have the CORESET configured with a spatial Rx parameter.

A time domain symbol closest to the signal has the CORESET with the lowest CORESETID, and does not have the CORESET configured with a spatial Rx parameter.

In each TCI state in a tab control information (TCI) state pool associated with the signal, a DL-RS set composed of down link-reference signals (DL-RSs) associated with spatial Rx parameters is a null set.

In each state in the TCI state pool associated with the signal, the DL-RS set composed of DL-RSs associated with spatial Rx parameters includes only one DL-RS.

In each TCI state in the TCI state pool associated with the signal, each two DL-RSs in the DL-RS set composed of DL-RSs associated with spatial Rx parameters satisfy a QCL relationship with respect to spatial Rx parameters.

In each TCI state in the TCI state pool associated with the signal, DL-RSs in the DL-RS set composed of DL-RSs associated with spatial Rx parameters can be simultaneously received by the first communication node.

In each TCI state in the TCI state pool associated with the signal, the DL-RSs in the DL-RS set composed of DL-RSs associated with spatial Rx parameters belong to a group.

In the case where in the same time domain symbol a spatial Rx parameter of a potential physical downlink shared channel (PDSCH) is different from a spatial Rx parameter of a CSI-RS, the PDSCH and the CSI-RS are received by using the spatial Rx parameter of the potential PDSCH.

The signal is an access point-channel state information-reference signal (AP-CSI-RS).

Each candidate value $K_0$ of an interval that is configured by higher-layer signaling and from a PDSCH to physical control signaling for scheduling the PDSCH is greater than a predetermined threshold K.

The first communication node is a communication node receiving the signal. The TCI state pool associated with the signal is a TCI state pool configured by radio resource control (RRC) signaling, or a TCI state pool activated by medium access control-control element (MAC-CE) signaling.

In an embodiment, in response to satisfying the predetermined constraint condition, the acquisition mode of the QCL parameter of the signal is a seventh acquisition mode; in response to not satisfying the predetermined constraint conditions, the acquisition mode of the QCL parameter of the signal is an eighth acquisition mode. Details are described below and not repeated here.

The signal includes at least one of a demodulation reference signal or a measurement reference signal.

Embodiment Nine-1

In new radio (NR), in to the case where a transmission interval between downlink control information (DCI) and a PDSCH is less than a predetermined threshold K, a QCL parameter of a DMRS of the PDSCH is acquired through a QCL parameter of a CORESET having the lowest CORESETID in the closest slot, where K is undetermined. In response to K is 0, the QCL parameter of the DMRS of the PDSCH is acquired according to information dynamically indicated in the DCI. This acquisition mode of the QCL parameter may be referred to as a seventh acquisition mode. In response to K is greater than 0, the QCL parameter of the DMRS of the PDSCH is acquired through the lowest CORESETID in a scenario where the transmission interval between the DCI and the PDSCH is less than K, and the QCL parameter of the DMRS of the PDSCH is acquired through dynamic indication in the DCI in a scenario where the transmission interval between the DCI and the PDSCH is greater than or equal to K. This acquisition mode of the QCL parameter is referred to as the eighth acquisition mode.

The difference between the seventh acquisition mode and the eighth acquisition mode described above is whether the value of K can be 0, or whether the acquisition parameter of the QCL parameter includes a relationship between the predetermined threshold K and the transmission interval between the DCI and the PDSCH.

Whether the QCL parameter of the DMRS of the PDSCH is acquired through the seventh acquisition mode or the eighth acquisition mode is determined according to constraint conditions 1 to 14 described below.

Constraint condition 1: A carrier frequency where a signal is located is less than a predetermined threshold. For example, if the carrier frequency where the PDSCH is located is less than 6 GHz, that is, in a low-frequency scenario, a terminal omni-directionally receives, and thus, the seventh acquisition mode may be used.

Constraint condition 2: A CORESET configured with a spatial Rx parameter does not exist in a CORESET set to be detected by the terminal. In this case, reception beams of the terminal are determined according to an agreed rule, or the reception beams of the terminal are omni-directional, and thus, the seventh acquisition mode7 may be used.

Constraint condition 3: The CORESET configured with a spatial Rx parameter does not exist in a CORESET set associated with a dedicated search space to be detected by a first communication node, that is, in a CORESET set associated with a dedicated search space of the terminal. In this case, the reception beams of the terminal are determined according to an agreed rule, or the reception beams of the terminal are omni-directional, and thus, the seventh acquisition mode may be used.

Constraint condition 4: A time unit closest to the signal has a CORESET with the lowest CORESETID, but does not have a CORESET configured with a spatial Rx parameter. In this case, the reception beams of the terminal are determined according to an agreed rule, or the reception beams of the terminal are omni-directional, and thus, the seventh acquisition mode may be used.

Constraint condition 5: A time domain symbol closest to the signal has the CORESET with the lowest CORESETID, but does not have the CORESET configured with a spatial Rx parameter.

In this case, the reception beams of the terminal are determined according to an agreed rule, or the reception beams of the terminal are omni-directional, and thus, the seventh acquisition mode may be used.

Constraint condition 6: In the case where the same time domain symbol a spatial Rx parameter of a potential PDSCH is different from a spatial Rx parameter of a CSI-RS, the PDSCH and the CSI-RS are received by using the spatial Rx parameter of the potential PDSCH. In this case, the terminal receives the PDSCH in the agreed manner. If the interval between the DCI and an AP-CSI-RS is less than K, reception beams of the PDSCH are used, so data is cached through the reception beams of the PDSCH, so that other QCL parameters of the AP-CSI-RS may be acquired through physical-layer dynamic control signaling, and thus, acquisition method 7 may be used.

Constraint condition 7: In each TCI state in a TCI state pool associated with the signal, a DL-RS set composed of down link-reference signals (DL-RSs) associated with spatial Rx parameters is a null set. That is, there is not such a TCI state where QCL parameters associated with a DL-RS in this TCI state include a spatial Rx parameter.

Constraint condition 8: In each state in the TCI state pool associated with the signal, the DL-RS set composed of DL-RSs associated with spatial Rx parameters includes only one DL-RS. In this case, no matter which TCI is called by the DCI, reception beams to be used by the terminal may be determined according to the one DL-RS, so that QCL parameters of the DMRS of the PDSCH may be acquired through the seventh acquisition mode.

Constraint condition 9: In each TCI state in the TCI state pool associated with the signal, each two DL-RSs in the DL-RS set composed of DL-RSs associated with spatial Rx parameters satisfy a QCL relationship with respect to spatial Rx parameters. In this case, no matter which TCI is scheduled by a base station, the terminal can simultaneously transmit these reception beams, and thus, the QCL parameter of the DMRS of the PDSCH may be acquired through the seventh acquisition mode.

Constraint condition 10: In each TCI state in the TCI state pool associated with the signal, DL-RSs in the DL-RS set composed of DL-RSs associated with spatial Rx parameters can be simultaneously received by the first communication node.

Constraint condition 11: Each candidate value $K_0$ of an interval between a PDSCH configured by higher-layer signaling and physical control signaling for scheduling the PDSCH is greater than a predetermined threshold K. In this case, a time domain position of the PDSCH may be jointly notified through the higher-layer signaling and physical-layer dynamic signaling. For example, the higher-layer signaling configures multiple time domain positions, and the dynamic signaling notifies a specific time domain position, where each time domain position configured by the higher-layer signaling includes the following information: $K_0$, a position S of a time domain starting symbol, and a duration L of the PDSCH. $K_0$ denotes a slot n+K, where the PDSCH is located, and slot n denotes a time domain symbol where the DCI scheduling the PDSCH is located. If each $K_0$ is greater than the predetermined threshold K in the multiple time domain positions configured by the higher-layer signaling, the beams of the PDSCH may be acquired according to a TCI domain indicated in the DCI, and thus, an aperiodic CSI-RS may also be directly acquired according to the beams indicated in the DCI.

Constraint condition 12: The terminal reports information about a capability of a frequency range supported by the terminal. For example, if the terminal reports that the terminal does not support a frequency domain range greater than 6 GHz through the capability, signals may be received by using omni-directional beams, and thus, the seventh acquisition mode may be used. For example, if the terminal capability is FR1 (frequency range 1), the first acquisition mode may be used.

Constraint condition 13: In each TCI state in the TCI state pool associated with the signal, the DL-RSs in the DL-RS set composed of DL-RSs associated with spatial Rx parameters belong to a group, and DL-RSs in this group can be simultaneously received by the terminal.

Constraint condition 14: In the case where the signal is the AP-CSI-RS, a QCL acquisition mode of the AP-CSI-RS is the seventh acquisition mode; if the signal is the DMRS of the PDSCH, the QCL parameter is acquired by using the eighth acquisition mode.

The TCI state pool associated with the signal is a TCI state pool configured by RRC signaling, or a TCI state pool activated by MAC-CE. The TCI state pool activated by the MAC-CE is a TCI state pool associated with a TCI indication domain of the DCI.

In the preceding modes, in the case where the signal is the AP-CSI-RS, the seventh acquisition mode is directly used. In another implementation mode of this embodiment, in the case where the signal is the AP-CSI-RS, whether the QCL parameter of the AP-CSI-RS is acquired through the seventh acquisition mode or the eighth acquisition mode is determined according to whether at least one of the above constraint conditions 1 to 13 is satisfied.

In another implementation mode of this embodiment, the terminal receives signaling information, and the signaling information informs the terminal whether the QCL parameter of at least one of the DMRS of the PDSCH or the AP-CSI-RS is acquired through the seventh acquisition mode or the eighth acquisition mode. For example, in response to the signaling information informing the terminal that the QCL parameter of the PDSCH/AP-CSI-RS is acquired through the seventh acquisition mode, the terminal directly uses the TCI notified in the DCI to acquire the QCL parameter; otherwise, the terminal acquires the QCL parameter of the PDSCH/AP-CSI-RS according to the relationship between the predetermined threshold K and the interval between the DCI and the PDSCH/AP-CSI-RS. For example, in the case where the interval between the DCI and the PDSCH/AP-CSI-RS is less than the predetermined threshold K, the QCL parameter of the PDSCH/AP-CSI-RS is acquired by using the QCL parameter configuration of the lowest CORESETID in the time unit/time domain symbol closest to the PDSCH/AP-CSI-RS; in response to the interval between the DCI and the PDSCH/AP-CSI-RS being greater than or equal to the predetermined threshold K, the QCL parameter of the PDSCH/AP-CSI-RS is acquired by using the TCI information notified in the DCI.

Embodiment Nine-2

Figure 13:
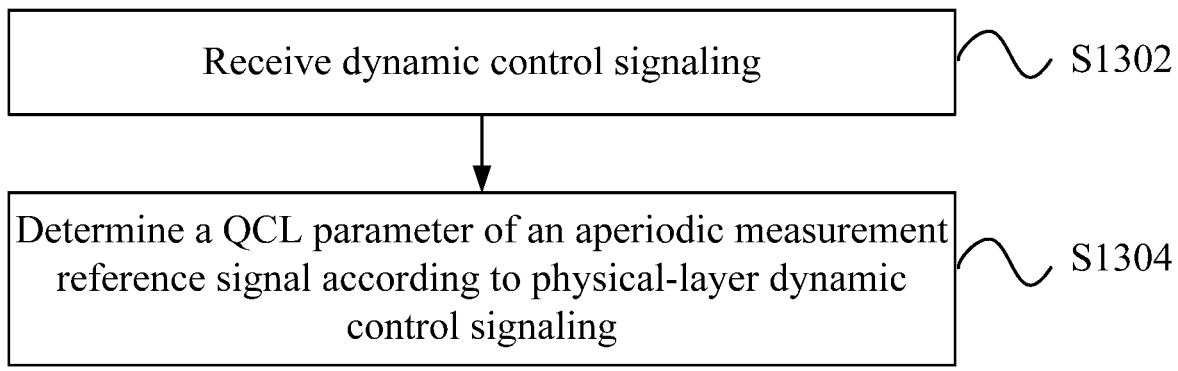
FIG. 13 is a flowchart of a method for determining a QCL parameter of an aperiodic measurement reference signal according to an embodiment of the present disclosure.

This embodiment of the present disclosure provides a method for determining a QCL parameter of an aperiodic measurement reference signal. This embodiment includes that a communication device acquires the QCL parameter of the aperiodic measurement reference signal. As shown in FIG. 13, the method includes steps S1302 and S1304.

In step S1302, dynamic control signaling is received.

In step S1304, the QCL parameter of the aperiodic measurement reference signal is determined according to physical-layer dynamic control signaling.

The physical-layer dynamic control signaling includes configuration information about the QCL parameter of the aperiodic measurement reference signal.

In an embodiment, the configuration information configuration information about the QCL parameter of the aperiodic measurement reference signal satisfies at least one of the features described below.

In the case where an interval between the physical-layer dynamic control signaling and the aperiodic measurement reference signal is less than a predetermined threshold, a DL-RS, which with the aperiodic measurement reference signal satisfies a QCL relationship with respect to spatial Rx parameters, and a reference signal associated with the lowest CORESETID satisfies a QCL relationship with respect to Rx parameters.

In the case where the interval between the physical-layer dynamic control signaling and the aperiodic measurement reference signal is less than the predetermined threshold, the DL-RS, which with the aperiodic measurement reference signal satisfies a QCL relationship with respect to spatial Rx parameters, and the reference signal associated with the lowest CORESETID can be simultaneously received by a first communication node.

In the case where the interval between the physical-layer dynamic control signaling and the aperiodic measurement reference signal is less than the predetermined threshold, the DL-RS, which with the aperiodic measurement reference signal satisfies a QCL relationship with respect to spatial Rx parameters, is the reference signal associated with the lowest CORESETID.

In the case where the interval between the physical-layer dynamic control signaling and the aperiodic measurement reference signal is less than the predetermined threshold, configuration information about the DL-RS, which with the aperiodic measurement reference signal satisfies a QCL relationship with respect to spatial Rx parameters, does not exists in configuration information about the aperiodic measurement reference signal.

The reference signal associated with the lowest CORESETID is a demodulation reference signal of a CORESETID, or a downlink reference signal which with a demodulation reference signal having the lowest CORESETID satisfies a QCL relationship with respect to Rx spatial parameters.

The first communication node is a communication node receiving the measurement reference signal.

In an embodiment, in the case where the interval between the physical-layer dynamic control signaling and the aperiodic measurement reference signal is less than the predetermined threshold, a QCL parameter other than the spatial Rx parameter of the aperiodic measurement reference signal is acquired through configuration information contained in the physical-layer dynamic control signaling; and/or the case where the interval between the physical-layer dynamic control signaling and the aperiodic measurement reference signal is less than the predetermined threshold, the spatial Rx parameter of the aperiodic measurement reference signal is acquired through configuration about a spatial Rx parameter having the lowest CORESETID.

In an embodiment, in the case where in the same time domain symbol spatial Rx parameter of the aperiodic measurement reference signal is different from a spatial Rx parameter of a potential PDSCH, the aperiodic measurement reference signal is received by using the spatial Rx parameter of the potential PDSCH.

In the case where in the same time domain symbol a spatial Rx parameter of the aperiodic measurement reference signal is different from a spatial Rx parameter of a PDSCH, the aperiodic measurement reference signal is received by using the spatial Rx parameter of the PDSCH.

Each candidate value $K_0$ of an interval that is configured by higher-layer signaling and from control signaling to the PDSCH is greater than a predetermined threshold K. For example, each $K_0$ that is configured by the higher-layer signaling and from DCI to the PDSCH is greater than the predetermined threshold K (in response to $K_0$ having a different unit than K, $K_0*N$ is compared against K, where N is the number of time domain symbols contained in a slot), and then, a spatial Rx parameter of the aperiodic measurement reference signal is acquired through information notified in the DCI.

In an embodiment, the potential PDSCH satisfies at least one of the features described below.

The potential PDSCH represents a PDSCH that falls in a predetermined time window after a CORESET to be detected by a terminal.

The potential PDSCH represents that an interval between the PDSCH and the control signaling for scheduling the PDSCH is less than the predetermined threshold.

The potential PDSCH represents a PDSCH that is able to fall in the predetermined time window after the CORESET to be detected by the terminal.

The potential PDSCH represents a PDSCH that is able to fall in the predetermined time window after the CORESET to be detected by the terminal and needs to be cached by the terminal.

In an embodiment, a CORESET with the lowest CORESETID satisfies at least one of the features described below.

The CORESET with the lowest CORESETID is a CORESET with the lowest CORESETID in a time domain symbol closest to the aperiodic measurement reference signal.

Different time domain symbols of one aperiodic measurement reference signal correspond to different CORESETs with lowest CORESETIDs.

Different measurement reference signal resources in one aperiodic measurement reference signal group correspond to different CORESETs with lowest CORESETIDs.

Figure 14:
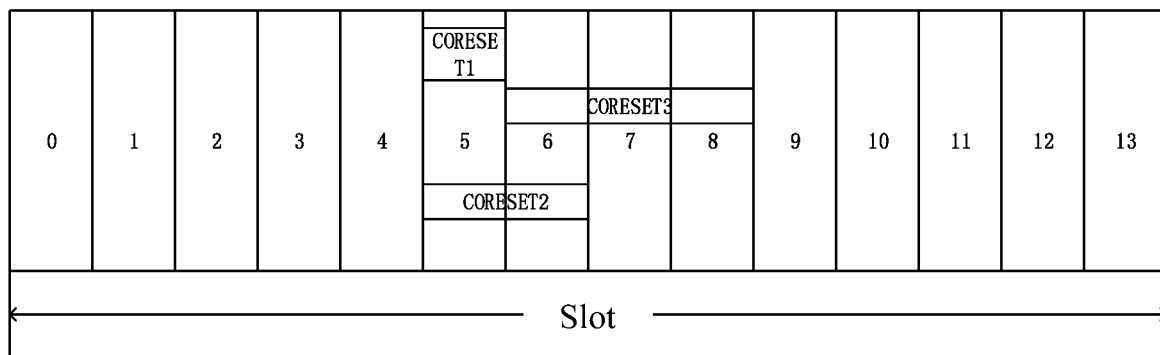
FIG. 14 is a schematic diagram of positions of CORE-SETs in a slot according to an embodiment of the present disclosure.

In an embodiment, as shown in FIG. 14, a CSI-RS resource occupies time domain symbols {5, 6, 7, 8}, CORESET1 has the lowest CORESETID on time domain symbol 5, CORESET2 has the lowest CORESETID on time domain symbol 6, and CORESET3 has the lowest CORESETID on time domain symbol 8. Alternatively, CSI-RS resources {1, 2, 3, 4} occupy time domain symbols {5, 6, 7, 8} in FIG. 14, respectively, then, a spatial Rx parameter of CSI-RS resource 1 is acquired according to a spatial Rx parameter of CORESET1, a spatial Rx parameter of CSI-RS resource 2 is acquired according to a spatial Rx parameter of CORESET2, a spatial Rx parameter of CSI-RS resource 3 is acquired according to a spatial Rx parameter of CORESET3, and a spatial Rx parameter of CSI-RS resource 4 is acquired according to a spatial Rx parameter of CORESET4.

Embodiment Ten

Figure 15:
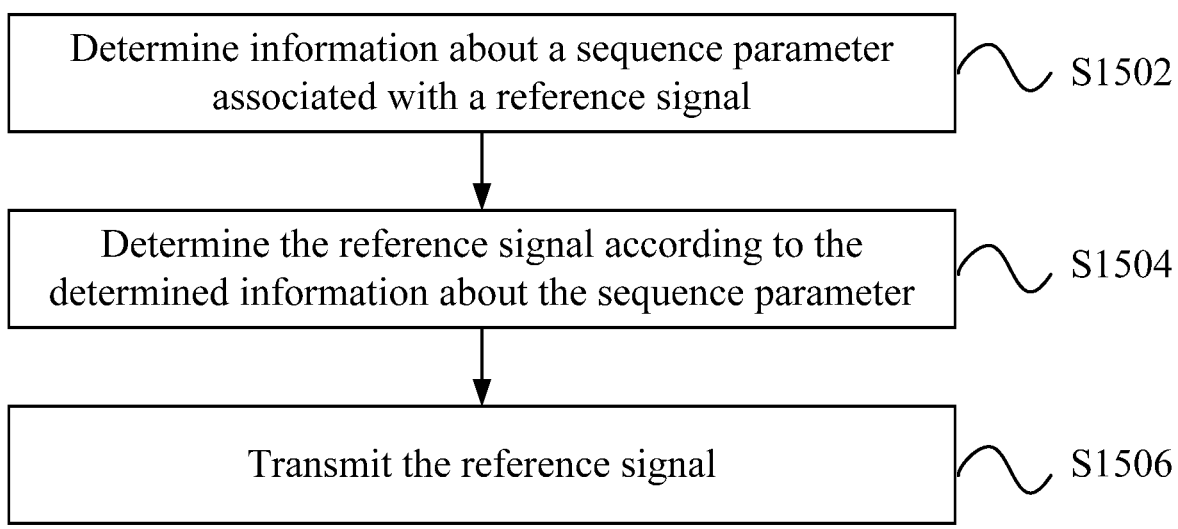
FIG. 15 is a flowchart of a method for determining a sequence parameter according to an embodiment of the present disclosure.

This embodiment provides a method for determining a sequence parameter. As shown in FIG. 15, the method includes steps S1502, S1504 and S1506.

In step S1502, information about a sequence parameter associated with a reference signal is determined.

In step S1504, the reference signal is determined according to the determined information about the sequence parameter.

In step S1506, the reference signal is transmitted.

The term "transmission" includes, but is not limited to, at least one of "sending" or "reception".

The sequence parameter is used for generating a sequence. The sequence parameter hops once every X time domain symbols, where X is an integer greater than or equal to 1.

In an embodiment, in the case where the sequence is a Zadoff-Chu sequence, the sequence parameter includes at least one of a sequence group number u, a sequence number v or sequence cyclic shift information.

In an embodiment, the reference signal includes at least one of: a measurement reference signal, a demodulation reference signal or a control channel frequency domain spreading sequence.

In an embodiment, X satisfies at least one of the following conditions: every X time domain symbols include the reference signal, X is less than or equal to the length of an OCC of the reference signal, X is associated with a set of time domain OCCs used by the reference signal, X is less than or equal to the number of time domain symbols occupied by the reference signal in a time unit, X is less than or equal to the number of consecutive time domain symbols occupied by the reference signal in the time unit, X is contained in physical-layer dynamic control signaling, or X is jointly encoded with at least the time domain OCC of the reference signal.

In an embodiment, an acquisition parameter of at least one of the sequence group number u or the sequence number v includes a parameter y, where the parameter y is acquired according to one of following formulas:

$$y = \bar{l} + l_{start};$$

$$y = \min(\bar{l}) + l_{start};$$

$$y = \max(\bar{l}) + l_{start};$$

$$y = 0;$$

or $$y = \left\lfloor \frac{l - l_{start,i}}{X} \right\rfloor + l_{start,i}, \ i = 1, 2, \ldots, X_{TD-OCC},$$

where $l_{start,i}$ denotes index information in the time unit about a time domain starting symbol corresponding to a group of time domain OCCs of the reference signal, $X_{TD-OCC}$ denotes index information in the time unit about a time domain symbol where the reference signal is located, and l denotes the number of time domain OCCs of the reference signal in the time unit.

$\bar{l}$ satisfies at least one of the following conditions: (i) $\bar{l}$ denotes the position of a time domain starting symbol corresponding to the group of time domain OCCs of the reference signal, or (ii) $\bar{l}$ is contained in signaling information, and $l_{start}$ is equal to 0 or $\bar{l}$ denotes index information in the time unit about a time domain starting symbol of a channel associated with the reference signal.

In an embodiment, the method satisfies at least one of the features described below.

In the case where the channel associated with the reference signal is a PUSCH and a mapping mode of the PUSCH is TypeA, $l_{start}$ is equal to 0; in the case where the channel associated with the reference signal is the PUSCH and a mapping mode of the PUSCH is TypeB, $l_{start}$ denotes index information in the time unit about the position of a starting symbol of the PUSCH, where the PUSCH includes a demodulation reference signal of the PUSCH.

The sequence number $u=(f_{gh}(n_{s,f}^\mu, y)+f_{ss}) \bmod C$.

$f_{gh}(n6_{s,f}^\mu, y)=(\Sigma_{m=0}^{D-1} c(D(n_{s,f}^\mu N_{symb}^{slot}+y)+m)\cdot 2^m) \bmod C$, where C denotes the total number of sequence group numbers, and D denotes a number greater than or equal to 8.

The sequence number $v=c(n_{s,f}^\mu N_{symb}^{slot}+y)$, where c(z) denotes the z-th value of a sequence generated by a random sequence function c(z), z is a non-negative integer, $n_{s,f}^\mu$ denotes a slot number in a frame, $N_{symb}^{slot}$ denotes the number of time domain symbols contained in a slot, $f_{ss}$ is obtained through signaling information and an agreed formula, and u denotes interval information about subcarriers and is used for acquiring $n_{s,f}^\mu$.

In an embodiment, the method satisfies at least one of the features described below.

The sequence parameter remains constant on consecutive time domain symbols occupied by the reference signal.

On the consecutive time domain symbols occupied by the reference signal, each sequence parameter is acquired according to index information about a time domain starting symbol of the consecutive time domain symbols.

Whether the sequence group number is enabled to hop is associated with a set of time domain OCCs used by the reference signal.

Whether the sequence number is enabled to hop is associated with the set of time domain OCCs used by the reference signal.

In response to the number of consecutive time domain symbols occupied by the reference signal being greater than 1, neither the sequence group number nor the sequence number hops.

Embodiment Ten-1

In this embodiment, in response to enabling an uplink DFT (that is, enabling transforming precoding), an uplink DMRS uses a ZC (Zadoff-Chu) sequence (or referred to as a Lower-PAPR sequence); in response to consecutive time domain symbols, a time domain OCC may be used. In this case, a DMRS reference signal $a_{k,l}^{(p_i,\mu)}$ of an uplink port p, is obtained through the formulas described below.

$$a_{k,l}^{(p_i,\mu)} = \beta_{DMRS} r^{(p_0)}(m)$$

$$k = 4m + 2k' + \Delta$$

$$k' = 0, 1$$

$$l = \bar{l} + l'$$

In the preceding formulas:

$$\begin{bmatrix} r^{(p_0)}(m) \\ \vdots \\ r^{(p_{\rho-1})}(m) \end{bmatrix} = W \begin{bmatrix} \tilde{r}_\lambda^{(\tilde{p}_0)}(m) \\ \vdots \\ \tilde{r}_\lambda^{(\tilde{p}_0)}(m) \end{bmatrix};$$

$$\tilde{r}^{(\tilde{p}_i)}(m) = \begin{cases} w_f(k') \cdot w_t(l') \cdot \bar{r}(n) & \text{if } \tilde{p}_i \text{ is in } CDM \text{ group } \lambda \\ 0 & \text{otherwise} \end{cases};$$

and $$m = 2n + k'$$

$\bar{r}(n)=r_{u,v}^{(\alpha,\delta)}(n)$, where $r_{u,v}^{(\alpha,\delta)}(m)$ denotes the ZC squence, $\delta=1$, $\alpha=0$, and W denotes a precoding matrix.

In the case where the PUSCH has mapping typeA, l denotes an index of a time domain symbol relative to a starting position of a slot. In the case where the PUSCH has mapping TypeB, l denotes an index of the time domain symbol relative to a starting symbol of the PUSCH. $\bar{l}$ denotes the position of a time domain starting symbol of a group of consecutive time domain symbols of the DMRS, or $\bar{l}$ denotes the position of a time domain starting symbol of a group of consecutive time domain symbols that is in the DMRS and participates in a time domain OCC. $\bar{l}$ is acquired through signaling information with reference to Table 3 or Table 4. Δ, $w_f(k')$, $w_t(k')$ is acquired through the signaling information with reference to Table 1 or Table 2. l' is acquired through the signaling information with reference to Table 5. In Table 3 and Table 4, $l_0$ is acquired through signaling information or a broadcast message.

TABLE 1

Parameters For PUSCH DM-RS Configuration Type 1

| $\bar{p}$ | CDM Group $\lambda$ | $\Delta$ | $w_f(k')$ k' = 0 | $w_f(k')$ k' = 1 | $w_t(l')$ l' = 0 | $w_t(l')$ l' = 1 |
|---|---|---|---|---|---|---|
| 0 | 0 | 0 | +1 | +1 | +1 | +1 |
| 1 | 0 | 0 | +1 | −1 | +1 | +1 |
| 2 | 1 | 1 | +1 | +1 | +1 | +1 |
| 3 | 1 | 1 | +1 | −1 | +1 | +1 |
| 4 | 0 | 0 | +1 | +1 | +1 | −1 |
| 5 | 0 | 0 | +1 | −1 | +1 | −1 |
| 6 | 1 | 1 | +1 | +1 | +1 | −1 |
| 7 | 1 | 1 | +1 | −1 | +1 | −1 |

TABLE 2

Parameters For PUSCH DM-RS Configuration Type 2

| $\bar{p}$ | CDM Group $\lambda$ | $\Delta$ | $w_f(k')$ k' = 0 | $w_f(k')$ k' = 1 | $w_t(l')$ l' = 0 | $w_t(l')$ l' = 1 |
|---|---|---|---|---|---|---|
| | 0 | 0 | +1 | +1 | +1 | +1 |
| | 0 | 0 | +1 | −1 | +1 | +1 |
| | 1 | 2 | +1 | +1 | +1 | +1 |
| | 1 | 2 | +1 | −1 | +1 | +1 |
| | 2 | 4 | +1 | +1 | +1 | +1 |
| | 2 | 4 | +1 | −1 | +1 | +1 |
| | 0 | 0 | +1 | +1 | +1 | −1 |
| | 0 | 0 | +1 | −1 | +1 | −1 |
| | 1 | 2 | +1 | +1 | +1 | −1 |
| | 1 | 2 | +1 | −1 | +1 | −1 |
| 0 | 2 | 4 | +1 | +1 | +1 | −1 |
| 1 | 2 | 4 | +1 | −1 | +1 | −1 |

TABLE 3

PUSCH DM-RS Positions $\bar{l}$ For Single-symbol DM-RS

| PUSCH Duration In Symbols | PUSCH Mapping Type A UL-DMRS-add-pos 0 | 1 | 2 | 3 | PUSCH Mapping Type B UL-DMRS-add-pos 0 | 1 | 2 | 3 |
|---|---|---|---|---|---|---|---|---|
| ≤7 | $l_0$ | — | — | — | 0 | 0, 4 | — | — |
| 8 | $l_0$ | — | — | — | 0 | 0, 6 | 0, 3, 6 | — |
| 9 | $l_0$ | $l_0$, 7 | — | — | 0 | 0, 6 | 0, 3, 6 | — |
| 10 | $l_0$ | $l_0$, 9 | $l_0$, 6, 9 | — | 0 | 0, 8 | 0, 4, 8 | 0, 3, 6, 9 |
| 11 | $l_0$ | $l_0$, 9 | $l_0$, 6, 9 | — | 0 | 0, 8 | 0, 4, 8 | 0, 3, 6, 9 |
| 12 | $l_0$ | $l_0$, 9 | $l_0$, 6, 9 | $l_0$, 5, 8, 11 | 0 | 0, 10 | 0, 5, 10 | 0, 3, 6, 9 |
| 13 | $l_0$ | $l_0$, 11 | $l_0$, 7, 11 | $l_0$, 5, 8, 11 | 0 | 0, 10 | 0, 5, 10 | 0, 3, 6, 9 |
| 14 | $l_0$ | $l_0$, 11 | $l_0$, 7, 11 | $l_0$, 5, 8, 11 | — | — | — | — |

TABLE 4

PUSCH DM-RS Positions $\bar{l}$ For Double-symbol DM-RS

| PUSCH Duration In Symbols | PUSCH Mapping Type A UL-DMRS-add-pos 0 | 1 | 2 | 3 | PUSCH Mapping Type B UL-DMRS-add-pos 0 | 1 | 2 | 3 |
|---|---|---|---|---|---|---|---|---|
| ≤7 | $l_0$ | — | | | 0 | — | | |
| 8 | $l_0$ | — | | | 0 | 0, 5 | | |
| 9 | $l_0$ | — | | | 0 | 0, 5 | | |
| 10 | $l_0$ | $l_0$, 8 | | | 0 | 0, 7 | | |
| 11 | $l_0$ | $l_0$, 8 | | | 0 | 0, 7 | | |
| 12 | $l_0$ | $l_0$, 8 | | | 0 | 0, 9 | | |

TABLE 4-continued

PUSCH DM-RS Positions $\bar{l}$ For Double-symbol DM-RS

| PUSCH Duration In Symbols | PUSCH Mapping Type A UL-DMRS-add-pos 0 | 1 | 2 | 3 | PUSCH Mapping Type B UL-DMRS-add-pos 0 | 1 | 2 | 3 |
|---|---|---|---|---|---|---|---|---|
| 13 | $l_0$ | $l_0$, 10 | | | 0 | | | |
| 14 | $l_0$ | $l_0$, 10 | | | — | — | | |

TABLE 5

PUSCH DM-RS Time Index l'

| DM-RS Duration | l' | Supported Antenna Ports p Configuration Type 1 | Configuration Type 2 |
|---|---|---|---|
| Single-Symbol DM-RS | 0 | 0-3 | 0-5 |
| Double-Symbol DM-RS | 0, 1 | 0-7 | 0-11 |

A group number u or a sequence number v of a ZC sequence may hop once every X time domain symbols so that the interference between intercell terminals is randomized. If the group number u or the sequence number v hops once each time domain symbol, when then time domain OCC is enabled, if frequency domain resources occupied by DMRSs of two UEs overlap each other, then the two users participating in the time domain OCC have different ZC sequences, and thus, the sequences of the two users form a pattern as $$\begin{bmatrix} a & b \\ c & -d \end{bmatrix}$$

(where rows denote different users participating in the time domain OCC and columns denote two REs participating in the time domain OCC) and cannot be orthogonalized. Therefore, in the time domain OCC, the sequence group number u or the sequence number v needs to keep constant, thus forming a pattern as $$\begin{bmatrix} a & a \\ c & -c \end{bmatrix}$$

a so that the two users whose frequency domain resources overlap each other may be orthogonalized through the time domain OCC. This can be implemented through at least one of modes 1 to 6 described below.

Mode 1: A base station informs, through the signaling information, that the sequence group number or the sequence number hops once every X time domain symbols. In an embodiment, the signaling information may be dynamic control information, and X is contained in the dynamic control signaling. For example, in the dynamic control signaling, X may be jointly encoded with at least one of the time domain OCC or a port number of the DMRS reference signal.

Mode 2: The base station and the terminal agree that: in response to the DMRS being the double-symbol pattern shown in Table 4, X=2 when the sequence group number or the sequence number is enabled to hop; in response to the DMRS being the single-symbol pattern shown in Table 3, X=1 when the sequence group number or the sequence number is enabled to hop. That is, X is equal to the number of consecutive time domain symbols occupied by the demodulation reference signal.

Figure 16:
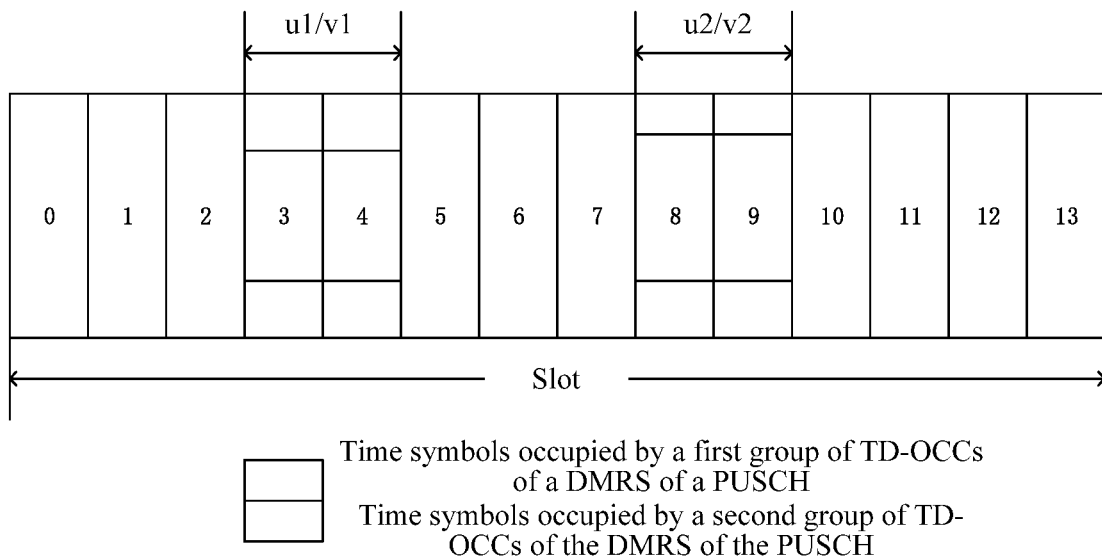
FIG. 16 is a schematic diagram of a hopping pattern of a sequence group number or a sequence number according to an embodiment of the present disclosure.
Figure 17:
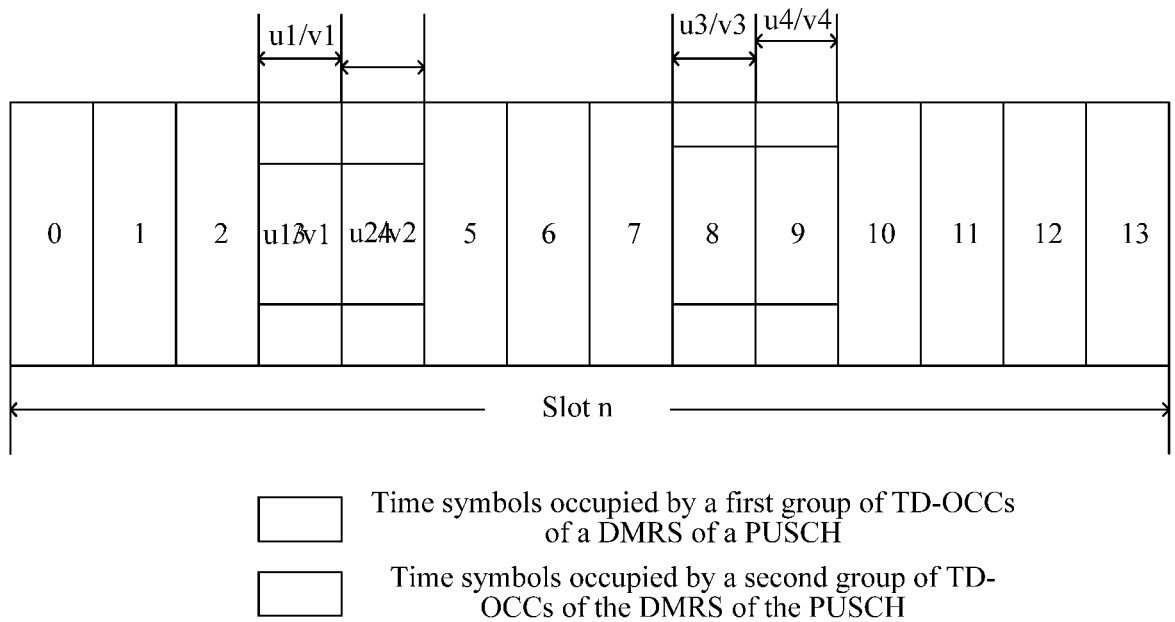
FIG. 17 is a schematic diagram of another hopping pattern of a sequence group number or a sequence number according to an embodiment of the present disclosure.

Mode 3: The base station and the terminal agree that: in response to the DMRS being the double-symbol pattern shown in Table 4 and the time domain OCC of the DMRS satisfying $w_f(l')=[1,-1]$, X=2 when the sequence group number or the sequence number is enabled to hop; in response to the time domain OCC of the DMRS satisfying $w_f(l')$ [1,1], X may be 1 or 2 and be further obtained through signaling. In response to X being 2, a hopping pattern of the sequence group number or sequence number is shown in FIG. 16, that is, the sequence group number u or the sequence number v hops once each 2 time domain symbols. In response to X being 1, hops of the sequence group number or the sequence number are shown in FIG. 17, and u or v hops once each time domain symbol.

Mode 4: X is specified to be less than or equal to the number of consecutive time domain symbols occupied by the demodulation reference signal.

Mode 5: X is specified to be equal to the number of time domain symbols occupied by the demodulation reference signal in a slot.

Mode 6: the sequence group number is acquired through the formula: $u=(f_{gh}(n_{s,f}^\mu,y)+f_{ss})\mod C$, where $f_{gh}(n_{s,f}^\mu,y)=(\Sigma_{m=0}^{D-1}c(D(n_{s,f}^\mu N_{symb}^{slot}+y)+m)\cdot 2^m)$ modC; or the sequence number is acquired through the formula: $v=c(n_{s,f}^\mu N_{symb}^{slot}+y)$, where y is obtained according to one of the formulas:

$$y = \bar{l} + l_{start};$$

$$y = \min{(\bar{l})} + l_{start}$$

$$y = \max{(\bar{l})} + l_{start};$$

$$y = 0;$$

$$y = \left\lfloor \frac{l - l_{start,i}}{X} \right\rfloor + l_{start,i}, i = 1, 2, \ldots, X_{TD-OCC}, l_{start,i};$$

or $$f_{gh}(n_{s,f}^\mu, y) = \left(\sum_{m=0}^{D-1} c(D(n_{s,f}^\mu) + m) \cdot 2^m\right) \mod C,$$

where the sequence number $v=c(n_{s,f}^\mu)$, for example, C is 30, and D is 8.

Figure 18:
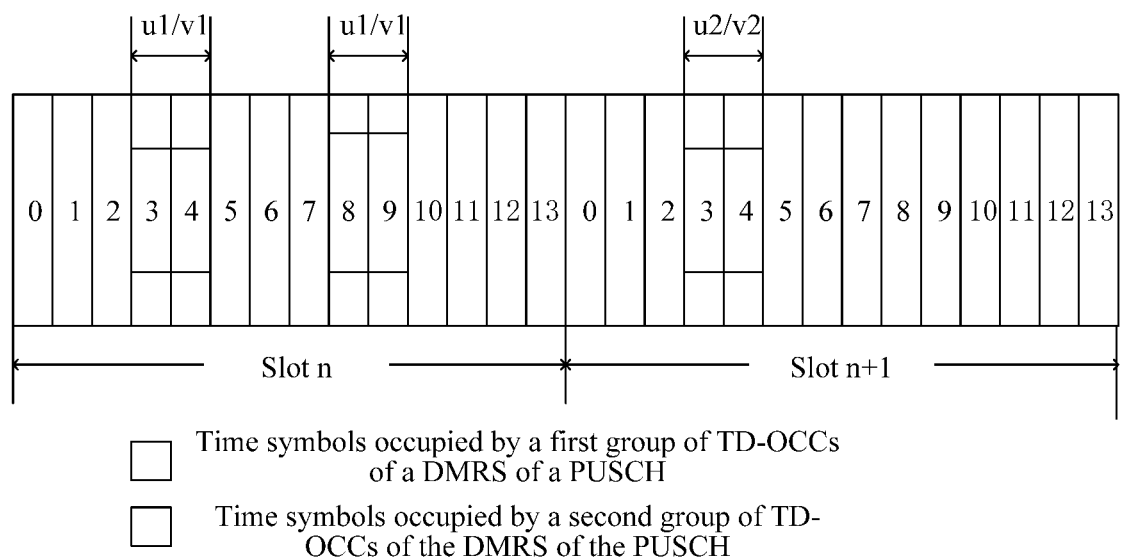
FIG. 18 is another schematic diagram of time domain symbols occupied by a demodulation reference signal in a slot according to an embodiment of the present disclosure.

In the case where the PUSCH has mapping typeA, $l_{start}$ is equal to 0. In the case where the PUSCH has mapping typeB, $l_{start}$ denotes an index of the starting symbol of the PUSCH in the slot, $X_{TD-OCC}$ denotes the number of TD-OCC time domain symbol sets of the DMRS in the slot, or the number of consecutive time domain symbol sets of the DMRS in the slot. As shown in FIG. 18, $X_{TD-OCC}$ is 2 in slotn, $X_{TD-OCC}$ is 1 in slotn+1, and $l_{start,i}$ denotes an index of a time domain starting symbol in a TD-OCC time domain symbol set, or an index of a time domain starting symbol in a consecutive time domain symbol set.

In an application embodiment, the base station informs, through the signaling information, that the sequence group number or the sequence number hops through any one of the preceding modes.

An embodiment of the present disclosure further provides a storage medium. The storage medium stores computer programs. The computer programs are configured to, when executed, perform the steps in any method embodiment described above.

In an embodiment, the storage medium may be configured to store computer programs for performing the method of any one of embodiments one to ten.

In an embodiment, the storage medium may include, but is not limited to, a USB flash disk, a read-only memory (ROM), a random access memory (RAM), a mobile hard disk, a magnetic disk, an optical disk or another medium capable of storing computer programs.

An embodiment of the present disclosure further provides an electronic device including a memory and a processor. The memory stores computer programs. The processor is configured to execute the computer programs to perform the steps in any method embodiment of embodiments one to ten described above.

An embodiment of the present disclosure further provides a base station. The base station includes a processor and a communication module. The processor is configured to determine priorities of M CSI reports, where M is a natural number not less than 1, and select an available channel resource from a channel resource set for receiving the M CSI reports, where the channel resource set includes J channel resources supporting reception of the M CSI reports and J is a natural number not less than 1. The communication module is configured to receive the CSI reports according to the priorities by using the available channel resource.

In an embodiment, for specific examples in this embodiment, reference may be made to the examples described in the embodiments and optional implementation modes described above, and repetition is not made in this embodiment.

Apparently, those skilled in the art should know that each of the above-mentioned modules or steps of the present disclosure may be implemented by a general-purpose computing device, the modules or steps may be concentrated on a single computing device or distributed on a network formed by multiple computing devices, and in an embodiment, the modules or steps may be implemented by program codes executable by the computing devices, so that the modules or steps may be stored in a storage device and executed by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any particular combination of hardware and software.

What is claimed is:

1. A method for determining a quasi-co-location (QCL) parameter, applied to a terminal, comprising:
   receiving configuration information; and
   determining whether the configuration information satisfies a predetermined constraint condition, and determining an acquisition mode of a QCL parameter of a signal according to the determination result;
   in a case where the configuration information satisfies the constraint condition, determining the QCL parameter of the signal according to a first acquisition mode;
   in a case where the configuration information does not satisfy the constraint condition, determining the QCL parameter of the signal according to a second acquisition mode;

wherein in the first acquisition mode, an acquisition parameter of the QCL parameter of the signal does not comprise a relationship between a predetermined threshold and a transmission interval between the signal and physical-layer dynamic control signaling that schedules the signal, and the QCL parameters of the signal are acquired from information indicated in the physical-layer dynamic control signaling; and in the second acquisition mode, the acquisition parameter of the QCL parameter of the signal comprises the relationship between the predetermined threshold and the transmission interval between the signal and the physical-layer dynamic control signaling;

receiving the signal according to the QCL parameter of the signal.

2. The method of claim 1, wherein in the second acquisition mode, in a case where a transmission interval between the physical-layer dynamic control signaling and the signal is less than a predetermined threshold, the QCL parameter of the signal is acquired according to a QCL parameter having a lowest control source set identification (CORESET ID), and in a case where the transmission interval between the physical-layer dynamic control signaling and the signal is greater than or equal to the predetermined threshold, the QCL parameter of the signal is acquired according to information indicated in the physical-layer dynamic control signaling.

3. The method of claim 1, wherein the predetermined constraint condition comprises at least one of:

a carrier frequency where the signal is located is less than a predetermined threshold;

a first communication node does not support a frequency domain range greater than a predetermined threshold, wherein the first communication node is a communication node that receives the signal; or in each TCI state in a transmission configuration information (TCI) state pool associated with the signal, a down link-reference signal (DL-RS) set composed of DL-RSs associated with spatial Rx parameters is a null set, the TCI state pool associated with the signal is a TCI state pool configured by a radio resource control (RRC) signaling, or a TCI state pool activated by a media access control layer control unit (MAC-CE) signaling.

4. The method of claim 1, wherein the signal comprises at least one of a demodulation reference signal or a measurement reference signal.

5. The method of claim 1, wherein in a case where the signal is an aperiodic measurement reference signal, the method comprises:

in a case where a spatial Rx parameter of the aperiodic measurement reference signal is different from a spatial Rx parameter of a PDSCH in one time domain symbol, the aperiodic measurement reference signal is received by using the spatial Rx parameter of the PDSCH.

6. A method for determining a quasi-co-location (QCL) parameter, applied to a base station, comprising:

sending configuration information; and determining whether the configuration information satisfies a predetermined constraint condition, and determining an acquisition mode of a QCL parameter of a signal according to the determination result;

in a case where the configuration information satisfies the constraint condition, determining the QCL parameter of the signal according to a first acquisition mode;

in a case where the configuration information does not satisfy the constraint condition, determining the QCL parameter of the signal according to a second acquisition mode;

wherein in the first acquisition mode, an acquisition parameter of the QCL parameter of the signal does not comprise a relationship between a predetermined threshold and a transmission interval between the signal and physical-layer dynamic control signaling that schedules the signal, and the QCL parameters of the signal are acquired from information indicated in the physical-layer dynamic control signaling; and in the second acquisition mode, the acquisition parameter of the QCL parameter of the signal comprises the relationship between the predetermined threshold and the transmission interval between the signal and the physical-layer dynamic control signaling;

sending the signal according to the QCL parameter of the signal.

7. The method of claim 6, wherein in the second acquisition mode, in a case where a transmission interval between the physical-layer dynamic control signaling and the signal is less than a predetermined threshold, the QCL parameter of the signal is acquired according to a QCL parameter having a lowest control source set identification (CORESET ID), and in a case where the transmission interval between the physical-layer dynamic control signaling and the signal is greater than or equal to the predetermined threshold, the QCL parameter of the signal is acquired according to information indicated in the physical-layer dynamic control signaling.

8. The method of claim 6, wherein the predetermined constraint condition comprises at least one of:

a carrier frequency where the signal is located is less than a predetermined threshold;

a first communication node does not support a frequency domain range greater than a predetermined threshold, wherein the first communication node is a communication node that receives the signal; or in each TCI state in a transmission configuration information (TCI) state pool associated with the signal, a down link-reference signal (DL-RS) set composed of DL-RSs associated with spatial Rx parameters is a null set, the TCI state pool associated with the signal is a TCI state pool configured by a radio resource control (RRC) signaling, or a TCI state pool activated by a media access control layer control unit (MAC-CE) signaling.

9. The method of claim 6, wherein the signal comprises at least one of a demodulation reference signal or a measurement reference signal.

10. The method of claim 6, wherein in a case where the signal is an aperiodic measurement reference signal, the method comprises:

in a case where a spatial Rx parameter of the aperiodic measurement reference signal is different from a spatial Rx parameter of a PDSCH in one time domain symbol, the aperiodic measurement reference signal is received by using the spatial Rx parameter of the PDSCH.

11. A terminal comprising a memory, a processor and a computer program stored in the memory and executable on the processor, wherein the processor, when executing the computer program, implements:

receiving configuration information; and determining whether the configuration information satisfies a predetermined constraint condition, and determining an acquisition mode of a QCL parameter of a signal according to the determination result;

in a case where the configuration information satisfies the constraint condition, determining the QCL parameter of the signal according to a first acquisition mode;

in a case where the configuration information does not satisfy the constraint condition, determining the QCL parameter of the signal according to a second acquisition mode;

wherein in the first acquisition mode, an acquisition parameter of the QCL parameter of the signal does not comprise a relationship between a predetermined threshold and a transmission interval between the signal and physical-layer dynamic control signaling that schedules the signal, and the QCL parameters of the signal are acquired from information indicated in the physical-layer dynamic control signaling; and in the second acquisition mode, the acquisition parameter of the QCL parameter of the signal comprises the relationship between the predetermined threshold and the transmission interval between the signal and the physical-layer dynamic control signaling;

receiving the signal according to the QCL parameter of the signal.

12. The terminal of claim 11, wherein in the second acquisition mode, in a case where a transmission interval between the physical-layer dynamic control signaling and the signal is less than a predetermined threshold, the QCL parameter of the signal is acquired according to a QCL parameter having a lowest control source set identification (CORESET ID), and in a case where the transmission interval between the physical-layer dynamic control signaling and the signal is greater than or equal to the predetermined threshold, the QCL parameter of the signal is acquired according to information indicated in the physical-layer dynamic control signaling.

13. The terminal of claim 11, wherein the predetermined constraint condition comprises at least one of:

a carrier frequency where the signal is located is less than a predetermined threshold;

a first communication node does not support a frequency domain range greater than a predetermined threshold, wherein the first communication node is a communication node that receives the signal; or in each TCI state in a transmission configuration information (TCI) state pool associated with the signal, a down link-reference signal (DL-RS) set composed of DL-RSs associated with spatial Rx parameters is a null set, the TCI state pool associated with the signal is a TCI state pool configured by a radio resource control (RRC) signaling, or a TCI state pool activated by a media access control layer control unit (MAC-CE) signaling.

14. The terminal of claim 11, wherein the signal comprises at least one of a demodulation reference signal or a measurement reference signal.

15. The terminal of claim 11, wherein in a case where the signal is an aperiodic measurement reference signal, the processor, when executing the computer program, implements:

in a case where a spatial Rx parameter of the aperiodic measurement reference signal is different from a spatial Rx parameter of a PDSCH in one time domain symbol, the aperiodic measurement reference signal is received by using the spatial Rx parameter of the PDSCH.

16. A base station comprising a memory, a processor and a computer program stored in the memory and executable on the processor, wherein the processor, when executing the computer program, implements the method for determining a quasi-co-location (QCL) parameter according to claim 6.

* * * * *